(12) United States Patent
Bisaiji et al.

(10) Patent No.: US 9,121,325 B2
(45) Date of Patent: ***Sep. 1, 2015

(54) EXHAUST PURIFICATION SYSTEM OF INTERNAL COMBUSTION ENGINE

(75) Inventors: Yuki Bisaiji, Mishima (JP); Kohei Yoshida, Gotemba (JP); Mikio Inoue, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/262,858

(22) PCT Filed: Aug. 30, 2010

(86) PCT No.: PCT/JP2010/065187
§ 371 (c)(1),
(2), (4) Date: Oct. 4, 2011

(87) PCT Pub. No.: WO2012/029188
PCT Pub. Date: Mar. 8, 2012

(65) Prior Publication Data
US 2013/0149205 A1    Jun. 13, 2013

(51) Int. Cl.
*F01N 3/10* (2006.01)
*F01N 3/00* (2006.01)
(Continued)

(52) U.S. Cl.
CPC .......... *F01N 3/2882* (2013.01); *B01D 53/9409* (2013.01); *F01N 3/0814* (2013.01); *F01N 3/0842* (2013.01); *F01N 3/0871* (2013.01); *F01N 3/2073* (2013.01); *F01N 9/00* (2013.01);
(Continued)

(58) Field of Classification Search
None
See application file for complete search history.

(56) References Cited

U.S. PATENT DOCUMENTS 5,052,178 A    10/1991   Clerc et al.
5,057,483 A    10/1991   Wan
(Continued)

FOREIGN PATENT DOCUMENTS

CN    101454081 A    6/2009
CN    101600860 A    12/2009
(Continued)

OTHER PUBLICATIONS

Office Action dated Jul. 24, 2013 issued in U.S. Appl. No. 13/202,692.
(Continued)

*Primary Examiner* — Walter D Griffin
*Assistant Examiner* — Jelitza Perez
(74) *Attorney, Agent, or Firm* — Oliff PLC

(57) ABSTRACT

In an internal combustion engine, inside of an engine exhaust passage, a hydrocarbon feed valve (15) and an exhaust purification catalyst (13) are arranged. The concentration of hydrocarbons which flows into the exhaust purification catalyst (13) is made to vibrate by within a predetermined range of amplitude of a 200 ppm or more and within a predetermined range of period of 5 second or less, whereby the $NO_x$ which is contained in exhaust gas is reduced at the exhaust purification catalyst (13). At this time, the nitrogen-containing intermediate which is produced in the $NO_x$ reduction process is exhausted from the exhaust purification catalyst (13). An intermediate purification catalyst (14) for removal of the exhausted nitrogen-containing intermediate is arranged downstream of the exhaust purification catalyst (13).

15 Claims, 15 Drawing Sheets

(51) Int. Cl.
- *B01D 53/94* (2006.01)
- *F01N 3/28* (2006.01)
- *F01N 3/08* (2006.01)
- *F01N 3/20* (2006.01)
- *F01N 9/00* (2006.01)
- *F01N 13/00* (2010.01)

(52) U.S. Cl.
CPC ........ *F01N 13/009* (2013.01); *B01D 2251/208* (2013.01); *B01D 2255/102* (2013.01); *B01D 2255/91* (2013.01); *B01D 2258/012* (2013.01); *F01N 2240/30* (2013.01); *F01N 2240/40* (2013.01); *F01N 2510/0684* (2013.01); *F01N 2570/24* (2013.01); *F01N 2610/146* (2013.01); *Y02T 10/24* (2013.01); *Y02T 10/47* (2013.01)

(56) References Cited

U.S. PATENT DOCUMENTS

| | | | |
|---|---|---|---|
| 5,075,274 A * | 12/1991 | Kiyohide et al. | 502/303 |
| 5,402,641 A | 4/1995 | Katoh et al. | |
| 5,882,607 A * | 3/1999 | Miyadera et al. | 422/177 |
| 6,109,024 A | 8/2000 | Kinugasa et al. | |
| 6,327,851 B1 | 12/2001 | Bouchez et al. | |
| 6,413,483 B1 | 7/2002 | Brisley et al. | |
| 6,477,834 B1 | 11/2002 | Asanuma et al. | |
| 6,667,018 B2 * | 12/2003 | Noda et al. | 423/213.5 |
| 6,813,882 B2 | 11/2004 | Hepburn et al. | |
| 6,854,264 B2 | 2/2005 | Elwart et al. | |
| 6,877,311 B2 | 4/2005 | Uchida | |
| 6,983,589 B2 | 1/2006 | Lewis, Jr. et al. | |
| 7,063,642 B1 | 6/2006 | Hu et al. | |
| 7,073,325 B2 | 7/2006 | Nakatani et al. | |
| 7,082,753 B2 | 8/2006 | Dalla Betta et al. | |
| 7,111,456 B2 | 9/2006 | Yoshida et al. | |
| 7,137,379 B2 | 11/2006 | Sasaki et al. | |
| 7,146,800 B2 | 12/2006 | Toshioka et al. | |
| 7,165,393 B2 | 1/2007 | Betta et al. | |
| 7,299,625 B2 | 11/2007 | Uchida et al. | |
| 7,332,135 B2 | 2/2008 | Gandhi et al. | |
| 7,412,823 B2 | 8/2008 | Reuter et al. | |
| 7,454,900 B2 | 11/2008 | Hayashi | |
| 7,484,504 B2 | 2/2009 | Kato et al. | |
| 7,506,502 B2 | 3/2009 | Nakano et al. | |
| 7,549,284 B2 | 6/2009 | Iihoshi et al. | |
| 7,703,275 B2 | 4/2010 | Asanuma et al. | |
| 7,707,821 B1 | 5/2010 | Legare | |
| 7,861,516 B2 | 1/2011 | Allansson et al. | |
| 8,099,950 B2 | 1/2012 | Kojima et al. | |
| 8,215,101 B2 | 7/2012 | Tsujimoto et al. | |
| 8,261,532 B2 | 9/2012 | Fukuda et al. | |
| 8,281,569 B2 | 10/2012 | Handa et al. | |
| 8,434,296 B2 | 5/2013 | Wada et al. | |
| 8,572,950 B2 | 11/2013 | Bisaiji et al. | |
| 8,656,706 B2 | 2/2014 | Umemoto et al. | |
| 8,671,667 B2 | 3/2014 | Bisaiji et al. | |
| 8,679,410 B2 | 3/2014 | Umemoto et al. | |
| 8,689,543 B2 | 4/2014 | Numata et al. | |
| 8,695,325 B2 | 4/2014 | Bisaiji et al. | |
| 2001/0052232 A1 | 12/2001 | Hoffmann et al. | |
| 2002/0029564 A1 | 3/2002 | Roth et al. | |
| 2002/0053202 A1 | 5/2002 | Akama et al. | |
| 2003/0010020 A1 | 1/2003 | Taga et al. | |
| 2003/0040432 A1 | 2/2003 | Beall et al. | |
| 2003/0101713 A1 | 6/2003 | Dalla Betta et al. | |
| 2004/0045285 A1 | 3/2004 | Penetrante et al. | |
| 2004/0050037 A1 | 3/2004 | Betta et al. | |
| 2004/0055285 A1 | 3/2004 | Rohr et al. | |
| 2004/0154288 A1 | 8/2004 | Okada et al. | |
| 2004/0175305 A1 | 9/2004 | Nakanishi et al. | |
| 2004/0187477 A1 | 9/2004 | Okugawa et al. | |
| 2005/0135977 A1 | 6/2005 | Park et al. | |
| 2005/0147541 A1 | 7/2005 | Ajisaka et al. | |
| 2006/0053778 A1 | 3/2006 | Asanuma et al. | |
| 2006/0107657 A1 | 5/2006 | Bernler et al. | |
| 2006/0153761 A1 | 7/2006 | Bandl-Konrad et al. | |
| 2006/0286012 A1 | 12/2006 | Socha et al. | |
| 2007/0016357 A1 | 1/2007 | Nakagawa et al. | |
| 2007/0028601 A1 | 2/2007 | Duvinage et al. | |
| 2007/0059223 A1 | 3/2007 | Golunski et al. | |
| 2007/0089403 A1 * | 4/2007 | Pfeifer et al. | 60/286 |
| 2007/0125073 A1 | 6/2007 | Reuter et al. | |
| 2007/0151232 A1 | 7/2007 | Dalla Betta et al. | |
| 2008/0022662 A1 | 1/2008 | Yan | |
| 2008/0053073 A1 | 3/2008 | Kalyanaraman et al. | |
| 2008/0102010 A1 | 5/2008 | Bruck et al. | |
| 2008/0120963 A1 | 5/2008 | Morita et al. | |
| 2008/0148711 A1 | 6/2008 | Takubo | |
| 2008/0154476 A1 | 6/2008 | Takubo | |
| 2008/0196398 A1 | 8/2008 | Yan | |
| 2008/0223020 A1 | 9/2008 | Yoshida et al. | |
| 2008/0276602 A1 | 11/2008 | McCabe et al. | |
| 2009/0000277 A1 | 1/2009 | Yoshida et al. | |
| 2009/0049824 A1 | 2/2009 | Kojima et al. | |
| 2009/0049825 A1 | 2/2009 | Ohashi | |
| 2009/0049826 A1 | 2/2009 | Toshioka et al. | |
| 2009/0077948 A1 | 3/2009 | Mondori et al. | |
| 2009/0084091 A1 | 4/2009 | Tsujimoto et al. | |
| 2009/0118121 A1 | 5/2009 | Sarai | |
| 2009/0120072 A1 | 5/2009 | Dalla Betta et al. | |
| 2009/0151332 A1 | 6/2009 | Toshioka et al. | |
| 2009/0191108 A1 | 7/2009 | Blanchard et al. | |
| 2009/0196811 A1 | 8/2009 | Yamashita et al. | |
| 2009/0229251 A1 | 9/2009 | Kadowaki | |
| 2009/0249768 A1 | 10/2009 | Asanuma et al. | |
| 2009/0266057 A1 | 10/2009 | Tsujimoto et al. | |
| 2009/0282809 A1 | 11/2009 | Toshioka | |
| 2009/0288393 A1 | 11/2009 | Matsuno et al. | |
| 2009/0313970 A1 | 12/2009 | Iida | |
| 2010/0005873 A1 | 1/2010 | Katoh et al. | |
| 2010/0055012 A1 | 3/2010 | Grisstede et al. | |
| 2010/0107613 A1 | 5/2010 | Masuda et al. | |
| 2010/0115923 A1 | 5/2010 | Tsujimoto et al. | |
| 2010/0126148 A1 | 5/2010 | Morishima et al. | |
| 2010/0132356 A1 | 6/2010 | Lee | |
| 2010/0154387 A1 | 6/2010 | Shibata et al. | |
| 2010/0233051 A1 | 9/2010 | Grisstede et al. | |
| 2010/0236224 A1 | 9/2010 | Kumar et al. | |
| 2010/0242459 A1 | 9/2010 | Tsujimoto et al. | |
| 2011/0041486 A1 | 2/2011 | Kato et al. | |
| 2011/0047984 A1 | 3/2011 | Lee et al. | |
| 2011/0047988 A1 | 3/2011 | Lewis et al. | |
| 2011/0113754 A1 | 5/2011 | Kohara et al. | |
| 2011/0120100 A1 | 5/2011 | Yin et al. | |
| 2011/0131952 A1 | 6/2011 | Onodera et al. | |
| 2011/0173950 A1 | 7/2011 | Wan et al. | |
| 2011/0209459 A1 | 9/2011 | Hancu et al. | |
| 2012/0122660 A1 | 5/2012 | Andersen et al. | |
| 2012/0124967 A1 | 5/2012 | Yang et al. | |
| 2012/0124971 A1 | 5/2012 | Bisaiji et al. | |
| 2012/0131908 A1 | 5/2012 | Bisaiji et al. | |
| 2013/0000284 A1 | 1/2013 | Bisaiji et al. | |
| 2013/0011302 A1 | 1/2013 | Bisaiji et al. | |
| 2013/0022512 A1 | 1/2013 | Bisaiji et al. | |

FOREIGN PATENT DOCUMENTS

| | | |
|---|---|---|
| EP | 1 033 479 A2 | 9/2000 |
| EP | 1 273 337 A1 | 1/2003 |
| EP | 1 371 415 A1 | 12/2003 |
| EP | 1 519 015 A2 | 3/2005 |
| EP | 1544429 A1 | 6/2005 |
| EP | 1 710 407 A1 | 10/2006 |
| EP | 1 793 099 A1 | 6/2007 |
| EP | 1 911 506 A1 | 4/2008 |
| EP | 1 936 164 A1 | 6/2008 |
| EP | 1 965 048 A1 | 9/2008 |
| EP | 2 063 078 A1 | 5/2009 |
| EP | 2 149 684 A1 | 2/2010 |
| EP | 2 239 432 | 10/2010 |
| EP | 2 460 989 A1 | 6/2012 |
| JP | A-04-200637 | 7/1992 |
| JP | A-H08-117601 | 5/1996 |

(56) References Cited

FOREIGN PATENT DOCUMENTS

| | | |
|---|---|---|
| JP | A-09-004437 | 1/1997 |
| JP | A-09-220440 | 8/1997 |
| JP | A-11-30117 | 2/1999 |
| JP | A-11-062559 | 3/1999 |
| JP | A-11-081994 | 3/1999 |
| JP | A-2000-257419 | 9/2000 |
| JP | A-2002-188429 | 7/2002 |
| JP | A-2004-016850 | 1/2004 |
| JP | A-2004-36543 | 2/2004 |
| JP | A-2004-216224 | 8/2004 |
| JP | A-2004-290965 | 10/2004 |
| JP | A-2004-308526 | 11/2004 |
| JP | A-2004-316458 | 11/2004 |
| JP | A-2005-61340 | 3/2005 |
| JP | A-2005-113801 | 4/2005 |
| JP | A-2005-171853 | 6/2005 |
| JP | A-2005-177738 | 7/2005 |
| JP | A-2006-501390 | 1/2006 |
| JP | A-2006-512529 | 4/2006 |
| JP | A-2006-342700 | 12/2006 |
| JP | A-2007-64167 | 3/2007 |
| JP | A-2007-514090 | 5/2007 |
| JP | A-2007-514104 | 5/2007 |
| JP | A-2007-154794 | 6/2007 |
| JP | B2-3969450 | 9/2007 |
| JP | A-2007-278120 | 10/2007 |
| JP | A-2008-002451 | 1/2008 |
| JP | A-2008-19760 | 1/2008 |
| JP | A-2008-69769 | 3/2008 |
| JP | A-2008-231926 | 10/2008 |
| JP | A-2008-232003 | 10/2008 |
| JP | A-2008-255858 | 10/2008 |
| JP | A-2008-267178 | 11/2008 |
| JP | A-2008-267217 | 11/2008 |
| JP | A-2008-286186 | 11/2008 |
| JP | A-2008-543559 | 12/2008 |
| JP | A-2009-30560 | 2/2009 |
| JP | A-2009-112967 | 5/2009 |
| JP | A-2009-114879 | 5/2009 |
| JP | A-2009-156067 | 7/2009 |
| JP | A-2009-165922 | 7/2009 |
| JP | A-2009-167973 | 7/2009 |
| JP | A-2009-168031 | 7/2009 |
| JP | A-2009-191823 | 8/2009 |
| JP | A-2009-221939 | 10/2009 |
| JP | A-2009-226349 | 10/2009 |
| JP | A-2009-243362 | 10/2009 |
| JP | A-2009-275631 | 11/2009 |
| JP | A-2009-275666 | 11/2009 |
| JP | A-2010-012459 | 1/2010 |
| JP | A-2010-048134 | 3/2010 |
| JP | A-2011-190803 | 9/2011 |
| JP | B1-4868097 | 2/2012 |
| WO | WO 2005/059324 | 6/2005 |
| WO | WO 2006/131825 | 12/2006 |
| WO | WO 2007/026229 | 3/2007 |
| WO | WO 2007/141638 | 12/2007 |
| WO | WO 2008/007810 | 1/2008 |
| WO | WO 2008/012653 A2 | 1/2008 |
| WO | WO 2009/016822 | 2/2009 |
| WO | WO 2009/056958 | 5/2009 |
| WO | WO 2009/082035 A1 | 7/2009 |
| WO | WO 2011/114499 | 9/2011 |
| WO | WO 2011/114501 | 9/2011 |
| WO | WO 2011/118044 | 9/2011 |

OTHER PUBLICATIONS

U.S. Appl. No. 13/202,733, filed Sep. 30, 2011 in the name of Bisaiji et al.
Office Action dated Dec. 20, 2013 issued in U.S. Appl. No. 13/264,230.
Corrected Notice of Allowability dated Feb. 6, 2014 issued in U.S. Appl. No. 13/202,694.
May 15, 2013 Office Action issued in U.S. Appl. No. 13/202,694.
Nov. 22, 2010 International Search Report issued in International Patent Application No. PCT/JP2010/065187.
International Search Report dated Jun. 15, 2010 issued in PCT/JP2010/054730 (with translation).
Written Opinion for PCT Application No. PCT/JP2010/065186 mailed Nov. 22, 2010 (with translation).
International Search Report for PCT Application No. PCT/JP2010/065186 mailed Nov. 22, 2010 (with translation).
Mar. 15, 2011 International Search Report issued in International Application No. PCT/JP2011/053429.
Oct. 26, 2012 Office Action issued in U.S. Appl. No. 13/202,692.
Nov. 26, 2012 Office Action issued in U.S. Appl. No. 13/202,694.
U.S. Appl. No. 13/202,694 in the name of Bisaiji et al., filed Sep. 19, 2011.
U.S. Appl. No. 13/202,692 in the name of Umemoto et al., filed Sep. 20, 2011.
U.S. Appl. No. 13/264,230 in the name of Bisaiji et al., filed Oct. 13, 2011.
Aug. 13, 2013 International Preliminary Report on Patentability issued in International Patent Application No. PCT/JP2011/053429 (with translation).
Aug. 8, 2013 Office Action issued in U.S. Appl. No. 13/258,483.
Dec. 21, 2010 International Search Report issued in International Patent Application No. PCT/JP2010/065449 (with translation).
Dec. 27, 2011 International Search Report issued in International Patent Application No. PCT/JP2011/075618 (with translation).
Jan. 18, 2011 International Search Report issued in International Patent Application No. PCT/JP2010/067705.
Jan. 18, 2011 International Search Report issued in International Application No. PCT/JP2010/067707.
Jan. 18, 2011 International Search Report issued in International Patent Application No. PCT/JP2010/068785.
Jul. 14, 2014 Office Action issued in U.S. Appl. No. 13/262,001.
Jul. 14, 2014 Office Action issued in U.S. Appl. No. 13/264,884.
Jun. 16, 2014 Office Action issued in U.S. Appl. No. 13/581,186.
Jun. 18, 2014 Office Action issued in U.S. Appl. No. 13/582,909.
Jun. 19, 2014 Office Action issued in U.S. Appl. No. 13/264,594.
Jun. 21, 2011 International Search Report issued in International Patent Application No. PCT/JP2011/059880 (with translation).
Jun. 26, 2014 Office Action issued in U.S. Appl. No. 13/580,000.
Jun. 29, 2010 International Search Report issued in International Patent Application No. PCT/JP2010/055303 (with translation).
Mar. 22, 2011 International Search Report issued in International Patent Application No. PCT/JP2010/073645 (with translation).
Mar. 22, 2011 International Search Report issued in International Patent Application No. PCT/JP2010/072299 (with translation).
Mar. 8, 2011 International Search Report issued in International Patent Application No. PCT/JP2011/052969 (with translation).
May 17, 2011 International Search Report issued in International Patent Application No. PCT/JP2011/057264 (with translation).
May 2, 2014 Office Action issued in U.S. Appl. No. 13/263,660.
Mar. 28, 2014 Notice of Allowance issued in U.S. Appl. No. 13/582,862.
Mar. 4, 2014 Notice of Allowance issued in U.S. Appl. No. 13/255,786.
Nov. 13, 2013 Notice of Allowance issued in U.S. Appl. No. 13/202,692.
Oct. 17, 2013 Notice of Allowance issued in U.S. Appl. No. 13/202,694.
Oct. 26, 2010 International Search Report issued in International Patent Application No. PCT/JP2010/063135.
Oct. 23, 2013 Office Action issued in U.S. Appl. No. 13/263,272.
Apr. 23, 2014 Office Action issued in U.S. Appl. No. 13/260,986.
Apr. 3, 2014 Office Action issued in U.S. Appl. No. 13/259,574.
Jul. 1, 2014 Office Action issued in U.S. Appl. No. 13/257,789.
May 7, 2014 Office Action issued in U.S. Appl. No. 13/264,062.
May 8, 2014 Office Action issued in U.S. Appl. No. 13/375,674.
U.S. Appl. No. 13/257,789 in the name of Nishioka et al., filed Oct. 14, 2011.
U.S. Appl. No. 13/258,483 in the name of Numata et al., filed Sep. 22, 2011.
U.S. Appl. No. 13/259,574 in the name of Tsukamoto et al., filed Sep. 23, 2011.

(56) References Cited

OTHER PUBLICATIONS

U.S. Appl. No. 13/259,885 in the name of Umemoto et al., filed Sep. 23, 2011.
U.S. Appl. No. 13/260,986 in the name of Watanabe et al., filed Sep. 29, 2011.
U.S. Appl. No. 13/263,272 in the name of Bisaiji et al., filed Oct. 6, 2011.
U.S. Appl. No. 13/263,660 in the name of Umemoto et al., filed Oct. 7, 2011.
U.S. Appl. No. 13/264,062 in the name of Watanabe et al., filed Oct. 12, 2011.
U.S. Appl. No. 13/264,594 in the name of Inoue et al., filed Oct. 14, 2011.
U.S. Appl. No. 13/264,884 in the name of Bisaiji et al., filed Oct. 17, 2011.
U.S. Appl. No. 13/375,674 in the name of Inoue et al., filed Dec. 1, 2011.
U.S. Appl. No. 13/578,148 in the name of Umemoto et al., filed Aug. 9, 2012.
U.S. Appl. No. 13/581,186 in the name of Kazuhiro Umemoto et al., filed Aug. 24, 2012.
U.S. Appl. No. 13/580,000 in the name of Bisaiji et al., filed Aug. 20, 2012.
U.S. Appl. No. 13/582,862 in the name of Uenishi et al., filed Sep. 5, 2012.
U.S. Appl. No. 13/582,909 in the name of Kazuhiro Umemoto et al., filed Sep. 5, 2012.
U.S. Appl. No. 14/108,113 in the name of Bisaiji et al., filed Dec. 16, 2013.
U.S. Appl. No. 14/152,629 in the name of Umemoto et al., filed Jan. 10, 2014.
U.S. Appl. No. 13/262,001 in the name of Inoue et al., filed Oct. 19, 2011.
Dec. 27, 2011 Written Opinion issued in International Patent Application No. PCT/JP2011/075618.
Aug. 6, 2014 Notice of Allowance in U.S. Appl. No. 13/259,574.
Nov. 27, 2013 Notice of Allowance issued in U.S. Appl. No. 13/258,483.
Oct. 4, 2013 Notice of Allowance issued in U.S. Appl. No. 13/259,885.
Jun. 15, 2010 International Search Report issued in PCT/JP2010/054740 (with translation).
Jun. 15, 2010 Written Opinion issued in PCT/JP2010/054740 (with translation).
Jun. 20, 2012 Search Report issued in European Patent Application No. 10845966.0.
Jun. 15, 2010 International Search Report issued in International Application No. PCT/JP2010/054731 (with translation).
Jun. 29, 2010 International Search Report issued International Patent Application No. PCT/JP2010/056345.
Apr. 4, 2013 Office Action issued in U.S. Appl. No. 13/255,710.
U.S. Appl. No. 13/255,774 in the name of Bisaiji et al., filed Sep. 22, 2011.
U.S. Appl. No. 13/255,710 in the name of Bisaiji et al., filed Oct. 12, 2011.
Oct. 24, 2013 Office Action issued in U.S. Appl. No. 13/255,710.
Jan. 17, 2013 Office Action issued in U.S. Appl. No. 13/202,733.
International Search Report dated Jun. 15, 2010 in International Application No. PCT/JP2010/054729.
International Search Report issued in International Application No. PCT/JP2011/066628 dated Sep. 13, 2011 (with Translation).
U.S. Appl. No. 13/502,210 in the name of Bisaiji et al., filed on Apr. 16, 2012.
U.S. Appl. No. 13/499,211 in the name of Bisaiji et al., filed Mar.29, 2012.
Jan. 22, 2014 Office Action issued in U.S. Appl. No. 13/499,211.
May 27, 2014 Office Action issued in U.S. Appl. No. 13/255,710.
Sep. 18, 2014 Notice of Allowance issued in U.S. Appl. No. 13/255,710.
U.S. Appl. No. 13/934,080 in the name of Bisaiji et al., filed Jul. 2013.
Oct. 2, 2014 Office Action issued in U.S. Appl. No. 13/582,862.
Jul. 9, 2013 Notice of Allowance issued in U.S. Appl. No. 13/255,774.
Dec. 9, 2013 Notice of Allowance issued in U.S. Appl. No. 13/262,506.
Dec. 27, 2013 Notice of Allowance issued in U.S. Appl. No. 13/502,210.
U.S. Appl. No. 13/262,506 in the name of Bisaili et al., filed Sep. 30, 2011.
Dec. 22, 2014 Office Action issued in U.S. Appl. No. 13/264,230.
Jun. 3, 2015 Office Action issued in U.S. Appl. No. 14/152,629.

* cited by examiner

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores $NO_x$ which is contained in exhaust gas when the air-fuel ratio of the inflowing exhaust gas is lean and which releases the stored $NO_x$ when the air-fuel ratio of the inflowing exhaust gas becomes rich, which arranges, in the engine exhaust passage upstream of the $NO_x$ storage catalyst, an oxidation catalyst which has an adsorption function, and which feeds hydrocarbons into the engine exhaust passage upstream of the oxidation catalyst to make the air-fuel ratio of the exhaust gas flowing into the $NO_x$ storage catalyst rich when releasing $NO_x$ from the $NO_x$ storage catalyst (for example, see Patent Literature 1).

In this internal combustion engine, the hydrocarbons which are fed when releasing $NO_x$ from the $NO_x$ storage catalyst are made gaseous hydrocarbons at the oxidation catalyst, and the gaseous hydrocarbons are fed to the $NO_x$ storage catalyst. As a result, the $NO_x$ which is released from the $NO_x$ storage catalyst is reduced well.

CITATION LIST

Patent Literature

Patent Literature 1: Japanese Patent No. 3969450

SUMMARY OF INVENTION

Technical Problem

However, there is the problem that when the $NO_x$ storage catalyst becomes a high temperature, the $NO_x$ purification rate falls.

An object of the present invention is to provide an exhaust purification system of an internal combustion engine which can obtain a high $NO_x$ purification rate even if the temperature of the exhaust purification catalyst becomes a high temperature.

Solution to Problem

According to the present invention, there is provided an exhaust purification system of an internal combustion engine in which an exhaust purification catalyst for reacting $NO_x$ contained in exhaust gas and reformed hydrocarbons is arranged inside of an engine exhaust passage, a precious metal catalyst is carried on an exhaust gas flow surface of the exhaust purification catalyst and a basic exhaust gas flow surface part is formed around the precious metal catalyst, the exhaust purification catalyst has a property of reducing the $NO_x$ which is contained in exhaust gas if the concentration of hydrocarbons flowing into the exhaust purification catalyst is made to vibrate within a predetermined range of amplitude and within a predetermined range of period and has a property of being increased in storage amount of $NO_x$ which is contained in exhaust gas if the vibration period of the hydrocarbon concentration is made longer than the predetermined range, at the time of engine operation, to reduce the $NO_x$ which is contained in exhaust gas at the exhaust purification catalyst, the concentration of hydrocarbons flowing into the exhaust purification catalyst is made to vibrate within the predetermined range of amplitude and within the predetermined range of period, at this time, the nitrogen-containing intermediate produced at the $NO_x$ reduction process is exhausted from the exhaust purification catalyst, and an intermediate purification catalyst for removal of the exhausted nitrogen-containing intermediate is provided downstream of the exhaust purification catalyst inside of the engine exhaust passage.

Advantageous Effects of Invention

Even if the temperature of the exhaust purification catalyst becomes a high temperature, a high $NO_x$ purification rate can be obtained.

DESCRIPTION OF EMBODIMENTS

Figure 1:
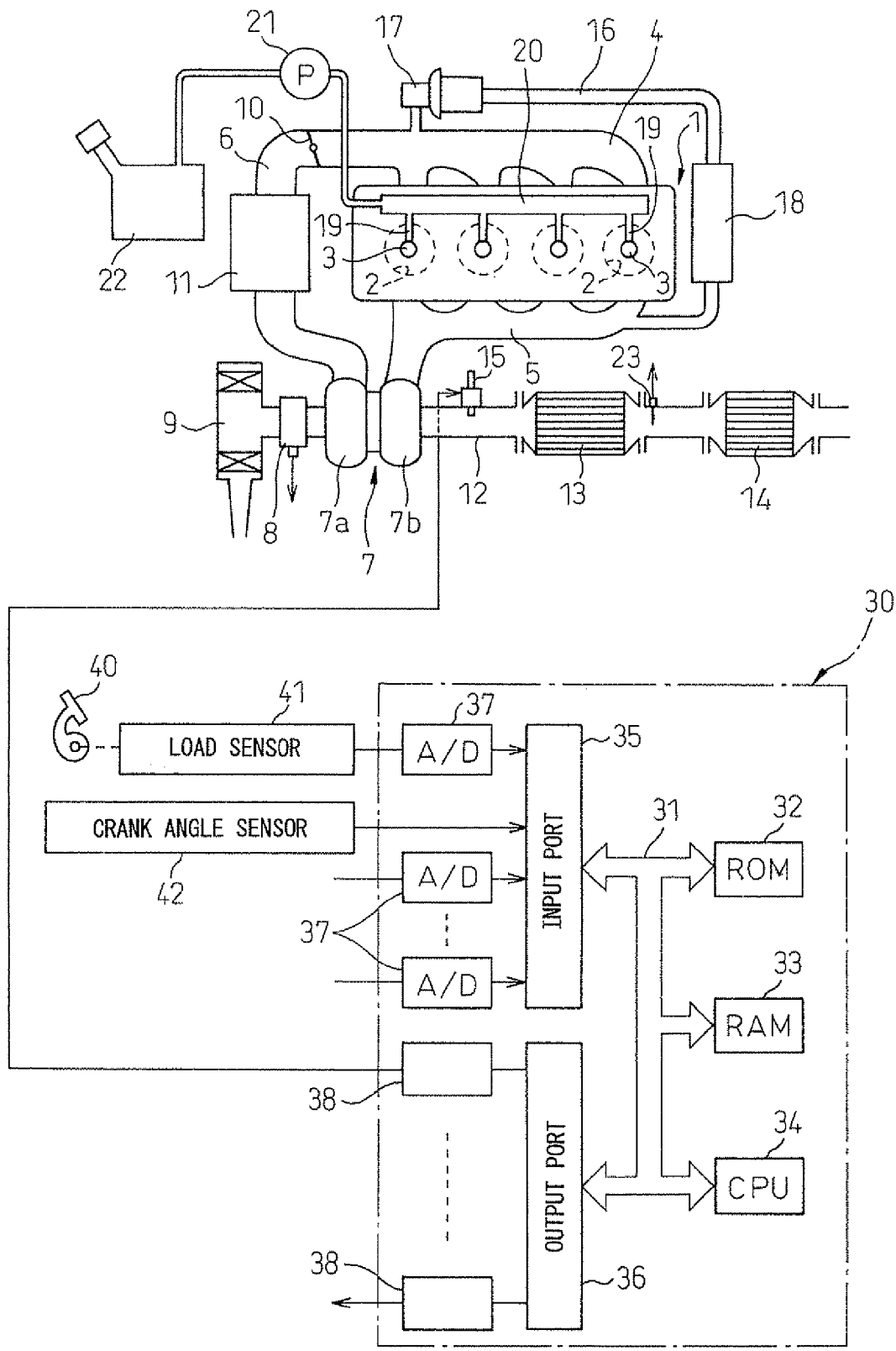
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. The outlet of the exhaust turbine 7b is connected through an exhaust pipe 12 to an inlet of the exhaust purification catalyst 13, and outlet of the exhaust purification catalyst 13 is connected to an intermediate purification catalyst 14 for removing a nitrogen-containing intermediate which is exhausted from the exhaust purification catalyst 13. Inside the exhaust pipe 12 upstream of the exhaust purification catalyst 13, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, a electronically controlled EGR control valve 17 is arranged. Inside the EGR passage 16, an electronically controlled EGR control valve 17 is arranged. Further, around the EGR passage 16, a cooling device 18 is arranged for cooling EGR gas flowing through the inside of the EGR passage 16. In the embodiment shown in FIG. 1, the engine cooling water is guided to the inside of the cooling device 18 where the engine cooling water is used to cool the EGR gas. On the other hand, each fuel injector 3 is connected through a fuel feed tube 19 to a common rail 20.

This common rail 20 is connected through an electronically controlled variable discharge fuel pump 21 to a fuel tank 22. The fuel which is stored inside of the fuel tank 22 is fed by the fuel pump 21 to the inside of the common rail 20, while the fuel which is fed to the inside of the common rail 20 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13, a temperature sensor 23 for detecting an exhaust gas temperature is attached. The output signals of this temperature sensor 23 and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, step motor for driving the throttle valve 10, hydrocarbon feed valve 15, EGR control valve 17, and fuel pump 21.

Figure 2:
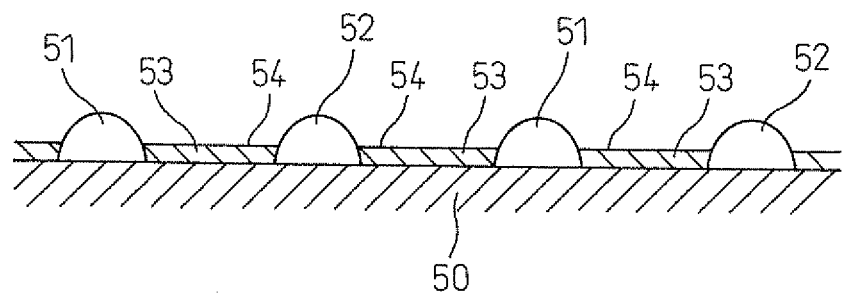
FIG. 2 is a view schematically showing a surface part of a catalyst carrier.

FIG. 2 schematically shows a surface part of a catalyst carrier which is carried on a substrate of the exhaust purification catalyst 13. At this exhaust purification catalyst 13, as shown in FIG. 2, for example, there is provided a catalyst carrier 50 made of alumina on which precious metal catalysts 51 and 52 are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_x$. The exhaust gas flows along the top of the catalyst carrier 50, so the precious metal catalysts 51 and 52 can be said to be carried on the exhaust gas flow surface of the exhaust purification catalyst 13. Further, the surface of the basic layer 53 exhibits basicity, so the surface of the basic layer 53 is called the basic exhaust gas flow surface part 54.

On the other hand, in FIG. 2, the precious metal catalyst 51 is comprised of platinum Pt, while the precious metal catalyst 52 is comprised of rhodium Rh. That is, the precious metal catalysts 51 and 52 which are carried on the catalyst carrier 50 are comprised of platinum Pt and rhodium Rh. Note that, on the catalyst carrier 50 of the exhaust purification catalyst 13, in addition to platinum Pt and rhodium Rh, palladium Pd may be further carried or, instead of rhodium Rh, palladium Pd may be carried. That is, the precious metal catalysts 51 and 52 which are carried on the catalyst carrier 50 are comprised of platinum Pt and at least one of rhodium Rh and palladium Pd.

Figure 3:
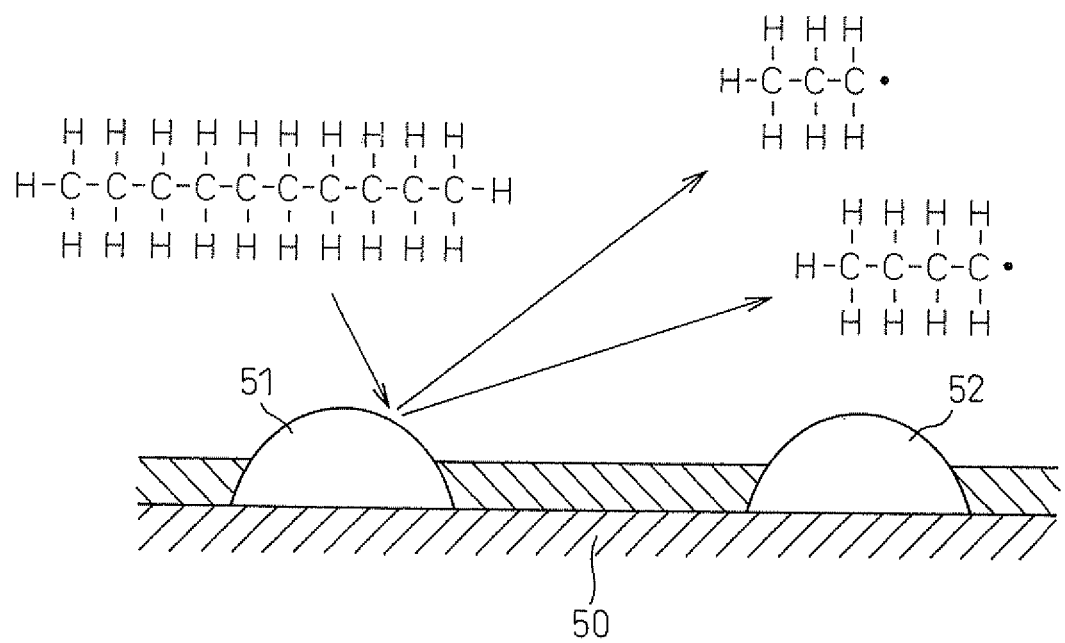
FIG. 3 is a view for explaining an oxidation reaction in an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_x$ at the exhaust purification catalyst 13. FIG. 3 schematically shows the reforming action performed at the exhaust purification 2C catalyst 13 at this time. As shown in FIG. 3, the hydrocarbons HC which are injected from the hydrocarbon feed valve 15 become radical hydrocarbons HC with a small carbon number by the catalyst 51.

Figure 4:
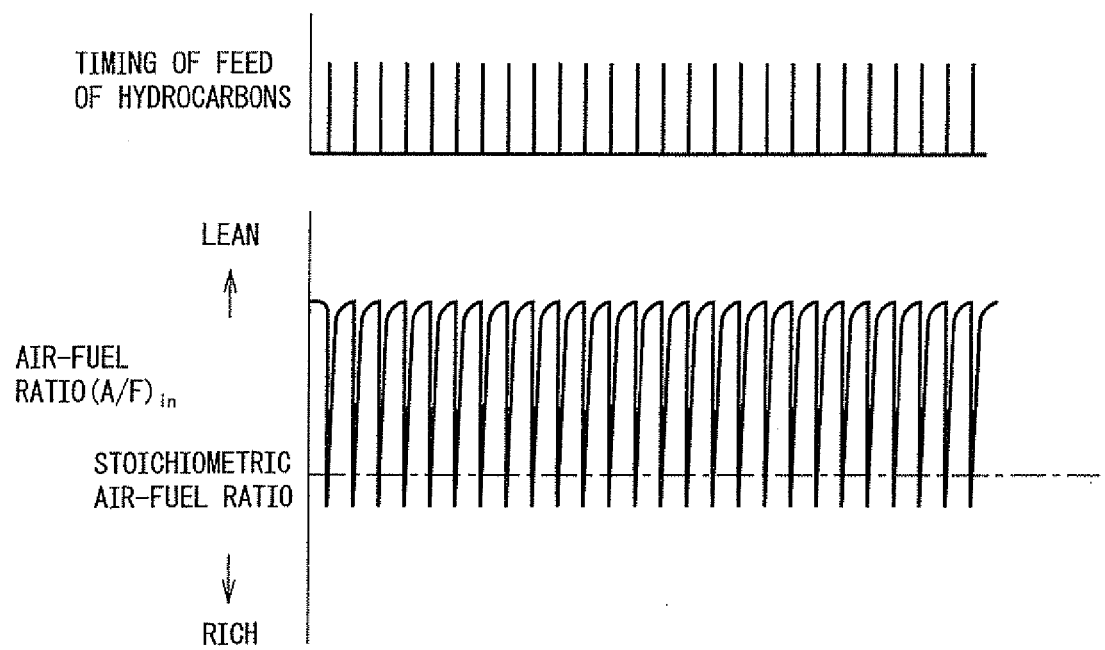
FIG. 4 is a view showing a change of an air-fuel ratio of exhaust gas flowing into an exhaust purification catalyst.

Note that, even if the fuel injector 3 injects fuel, that is, hydrocarbons, into the combustion chamber 2 in the second half of the expansion stroke or exhaust stroke, the hydrocarbons are reformed in the combustion chamber 2 or exhaust purification catalyst 13, and the $NO_x$ which is contained in exhaust gas is removed by the reformed hydrocarbons in the exhaust purification catalyst 13. Therefore, in the present invention, instead of feeding hydrocarbons from the hydrocarbon feed valve 15 to the inside of an engine exhaust passage, it is also possible to feed hydrocarbons into the combustion chamber 2 in the second half of the expansion stroke or exhaust stroke. In this way, in the present invention, it is possible to feed hydrocarbons into a combustion chamber 2, but below, the present invention will be explained with reference to the case of trying to inject hydrocarbons from a hydrocarbon feed valve 15 to the inside of an engine exhaust passage FIG. 4 shows the feed timing of hydrocarbons from the hydrocarbon feed valve 15 and the change in the air-fuel ratio (A/F)in of the exhaust gas which flows into the exhaust purification catalyst 13. Note that, the changes in the air-fuel ratio (A/F)in depend on the change in concentration of the hydrocarbons in the exhaust gas which flows into the exhaust purification catalyst 13, so it can be said that the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in FIG. 4, the more to the rich side the air-fuel ratio (A/F)in becomes, the higher the hydrocarbon concentration.

Figure 5:
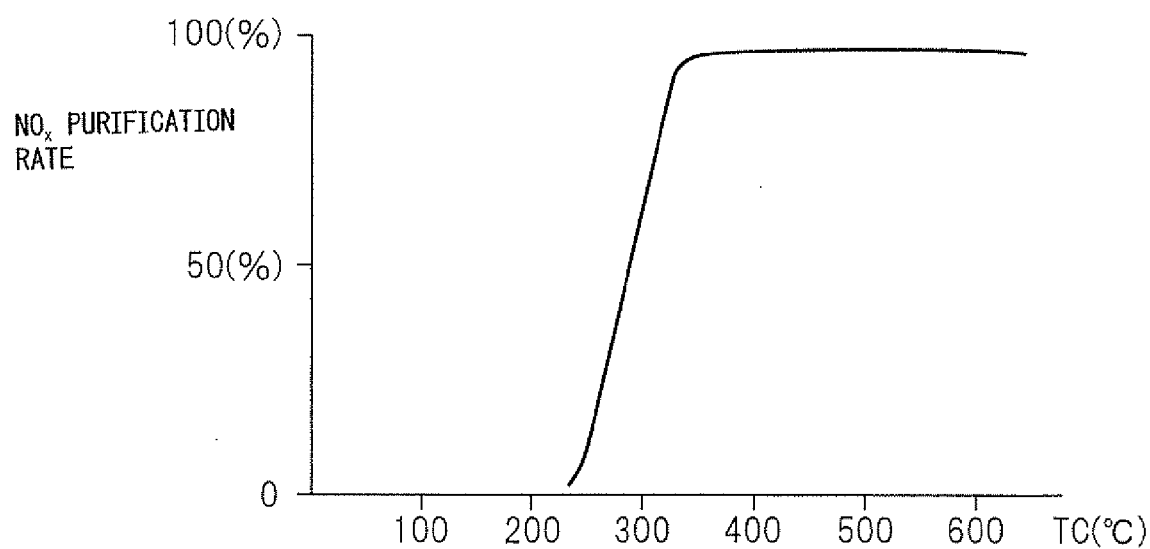
FIG. 5 is a view showing an $NO_x$ purification rate.

FIG. 5 shows the $NO_x$ purification rate by the exhaust purification catalyst 13 with respect to the catalyst temperatures of the exhaust purification catalyst 13 when periodically making the concentration of hydrocarbons flowing into the exhaust purification catalyst 13 change so as to, as shown in FIG. 4, make the air-fuel ratio (A/F)in of the exhaust gas flowing to the exhaust purification catalyst 13 change. The inventors engaged in research relating to $NO_x$ purification for a long time. In the process of research, they learned that if making the concentration of hydrocarbons flowing into the exhaust purification catalyst 13 vibrate by within a predetermined range of amplitude and within a predetermined range of period, as shown in FIG. 5, an extremely high $NO_x$ purification rate is obtained even in a 400° C. or higher high temperature region.

Figure 6A:
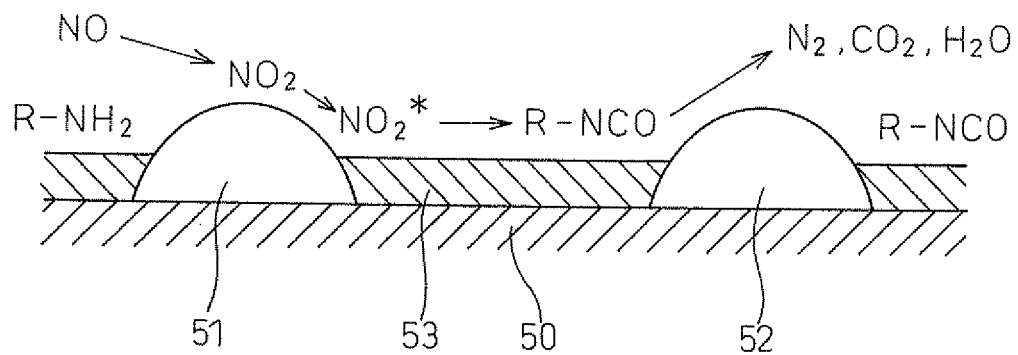
FIGS. 6A and 6B are views for explaining an oxidation reduction reaction in an exhaust purification catalyst.
Figure 6B:
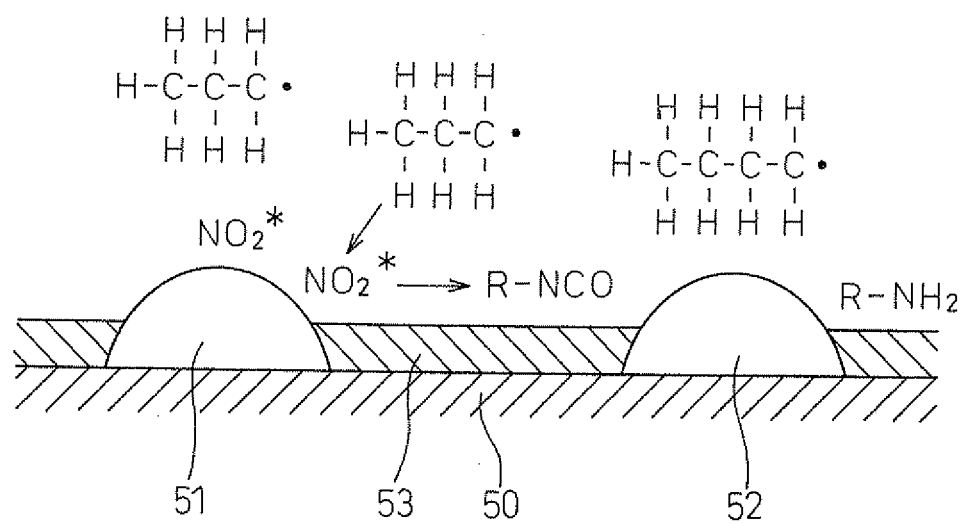

Furthermore, at this time, a large amount of reducing intermediate containing nitrogen and hydrocarbons continues to be held or adsorbed on the surface of the basic layer 53, that is, on the basic exhaust gas flow surface part 54 of the exhaust purification catalyst 13. It is learned that this reducing intermediate plays a central role in obtaining a high $NO_x$ purification rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons flowing into the exhaust purification catalyst 13 is made to vibrate by within a predetermined range of amplitude and within a predetermined range of period.

FIG. 6A shows when the concentration of hydrocarbons flowing into the exhaust purification catalyst 13 is low, while FIG. 6B shows when hydrocarbons are fed from the hydrocarbon feed valve 15 and the concentration of hydrocarbons flowing into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. Therefore, the NO which is contained in the exhaust gas, as shown in FIG. 6A, is oxidized on the platinum 51 and becomes $NO_2$. Next, this $NO_2$ is supplied with electrons from the platinum 51 and becomes $NO_2^-$. Therefore, a large amount of $NO_2^-$ is produced on the platinum 51. This $NO_2^-$ is strong in activity. Above, this $NO_2^-$ is called the active $NO_2^*$.

On the other hand, if hydrocarbons are fed from the hydrocarbon feed valve 15, as shown in FIG. 3, the hydrocarbons are reformed and become radicalized inside of the exhaust purification catalyst 13. As a result, as shown in FIG. 6B, the hydrocarbon concentration around the active $NO_2^*$ becomes higher. In this regard, after the active $NO_2^*$ is produced, if the state of a high oxygen concentration around the active $NO_2^*$ continues for a predetermined time or more, the active $NO_2^*$ is oxidized and is absorbed in the basic layer 53 in the form of nitrate ions $NO_3^-$. However, if the hydrocarbon concentration around the active $NO_2^*$ is made higher before this predetermined time passes, as shown in FIG. 65, the active $NO_2$ reacts on the platinum 51 with the radical hydrocarbons HC whereby a reducing intermediate is produced. This reducing intermediate is adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—ON can only survive for an instant in this state, so immediately becomes an isocyanate compound R—NCO. If this isocyanate compound R—NCO is hydrolyzed, it becomes an amino compound R—$NH_2$. If this isocyanate compound R—NCO. However, in this case, what is hydrolyzed is considered to be part of the isocyanate compound R—NCO. Therefore, as shown in FIG. 6B, the majority of the reducing intermediate which is held or adsorbed on the surface of the basic layer 53 is believed to be the isocyanate compound R—NCO and amine compound R—$NH_2$.

On the other hand, as shown in FIG. 6B, if the produced reducing intermediate is surrounded by the hydrocarbons HC, the reducing intermediate is blocked by the hydrocarbons HO and the reaction will not proceed any further. In this case, if the concentration of hydrocarbons flowing into the exhaust purification catalyst 13 is lowered and thereby the oxygen concentration becomes higher, the hydrocarbons, around the reducing intermediate will be oxidized. As a result, as shown in FIG. 6A, the reducing intermediate and the active $NO_2^*$ will react. At this time, the active $NO_2^*$ reacts with the reducing intermediate R—NCO or R—$NH_2$ to form $N_2$, $CO_2$, and $H_2O$ and consequently the $NO_x$ is removed.

In this way, in the exhaust purification catalyst 13, by making the concentration of hydrocarbons flowing into the exhaust purification catalyst 13 higher, a reducing intermediate is produced. By making the concentration of hydrocarbons flowing into the exhaust purification catalyst 13 lower and raising the oxygen concentration, the active $NO_2^*$ reacts with the reducing intermediate and the $NO_x$ is removed. That is, in order for the exhaust purification catalyst 13 to remove the $NO_x$, the concentration of hydrocarbons flowing into the exhaust purification catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the active $NO_2^*$. That is, the concentration of hydrocarbons flowing into the exhaust purification catalyst 13 has to be made to vibrate within a predetermined range of amplitude. Note that, in this case, a sufficient amount of reducing intermediate R—NCO or R—$NH_2$ has to be held on the basic layer 53, that is, on the basic exhaust gas flow surface part 24, until the produced reducing intermediate reacts with the active $NO_2^*$. For this reason, the basic exhaust gas flow surface part 24 is provided.

On the other hand, if lengthening the feed period of the hydrocarbons, the time in which the oxygen concentration becomes higher becomes longer in the period after the hydrocarbons are fed until the hydrocarbons are next fed. Therefore, the active $NO_2^*$ is absorbed in the basic layer 53 in the form of nitrates without producing a reducing intermediate. To avoid this, it is necessary to make the concentration of hydrocarbons flowing into the exhaust purification catalyst 13 vibrate by within a predetermined range of period.

Therefore, in an embodiment of the present invention, to make the $NO_x$ contained in the exhaust gas and the reformed hydrocarbons react and produce the reducing intermediate R—NCO or R—$NH_2$ containing nitrogen and hydrocarbons, precious metal catalysts 51 and 52 are carried on the exhaust gas flow surface of the exhaust purification catalyst 13. To hold the produced reducing intermediate R—NCO or R—$NH_2$ inside the exhaust purification catalyst 13, a basic exhaust gas flow surface part 54 is formed around the precious metal catalysts 51 and 52. The vibration period of the hydrocarbon concentration is made the vibration period required for continuation of the production of the reducing intermediate R—NCO or R—$NH_2$. Incidentally, in the example shown in FIG. 4, the injection interval is made 3 seconds.

Figure 7A:
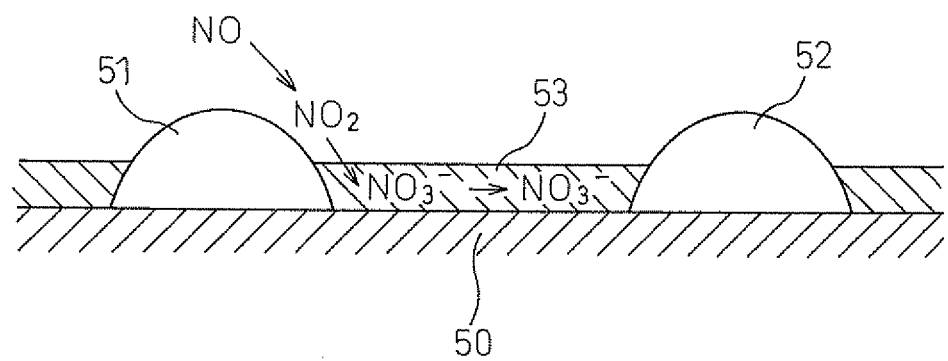
FIGS. 7A and 7B are views for explaining an oxidation reduction reaction in an exhaust purification catalyst.

If the vibration period of the hydrocarbon concentration, that is, the feed period of the hydrocarbons HC, is made longer than the above predetermined range of period, the reducing intermediate R—NCO or R—$NH_2$ disappears from the surface of the basic layer 53. At this time, the active $NO_2^*$ which was produced on the platinum Pt 53, as shown in FIG. 7A, diffuses in the basic layer 53 in the form of nitrate ions $NO_3^-$ and becomes nitrates. That is, at this time, the $NO_x$ in the exhaust gas is absorbed in the form of nitrates inside of the basic layer 53.

Figure 7B:
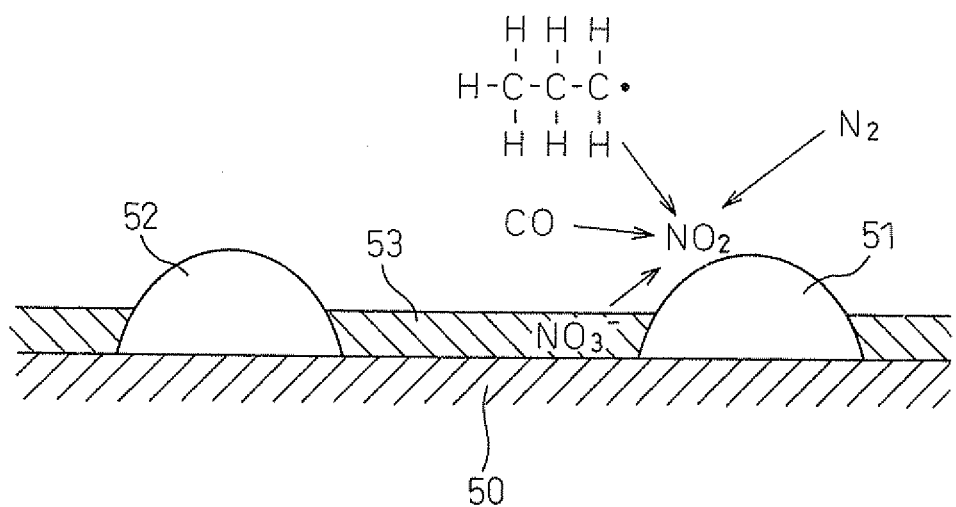

On the other hand, FIG. 7B shows the case where the air-fuel ratio of the exhaust gas which flows into the exhaust purification catalyst 13 is made the stoichiometric air-fuel ratio or rich when the $NO_x$ is absorbed in the form of nitrates inside of the basic layer 53. In this case, the oxygen concentration in the exhaust gas falls, so the reaction proceeds in the opposite direction ($NO_3^- \rightarrow *NO_2$), and consequently the nitrates absorbed in the basic layer 53 become nitrate ions $NO_3^-$ one by one and, as shown in FIG. 7B, are released from the basic layer 53 in the form of $NO_2$. Next, the released NO2 is reduced by the hydrocarbons HO and CO contained in the exhaust gas.

Figure 8:
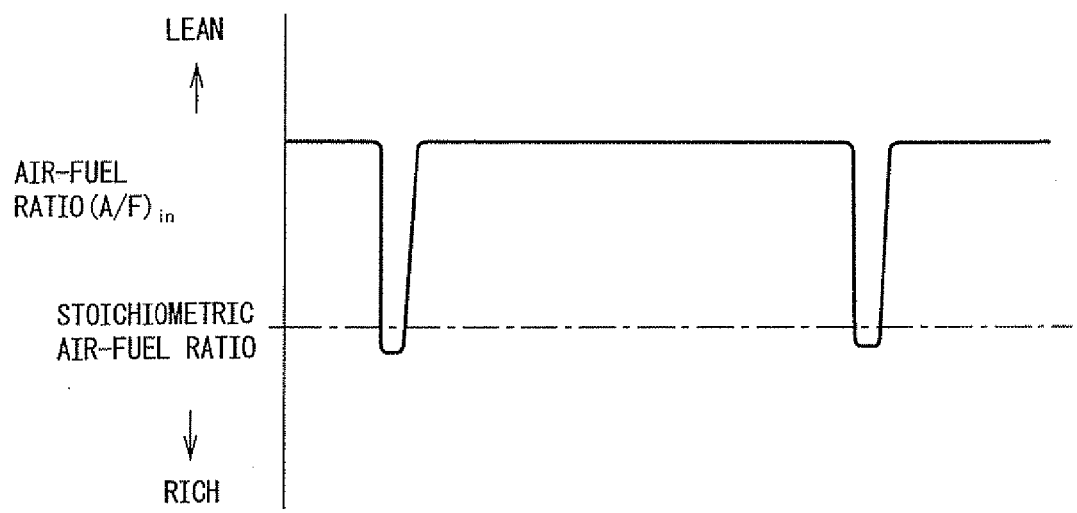
FIG. 8 is a view showing a change of an air-fuel ratio of exhaust gas flowing into an exhaust purification catalyst.

FIG. 8 shows the case of making the air-fuel ratio (A/F)in of the exhaust gas which flows into the exhaust purification catalyst 13 temporarily rich slightly before the $NO_x$ absorption ability of the basic layer 53 becomes saturated. Note that, in the example shown in FIG. 8, the time interval of this rich control is 1 minute or more. In this case, the $NO_x$ which was absorbed in the basic layer 53 when the air-fuel ratio (A/F)in of the exhaust gas was lean is released all at once from the basic layer 53 and reduced when the air-fuel ratio (A/F)in of the exhaust gas is made temporarily rich. Therefore, in this case, the basic layer 53 plays the role of an absorbent for temporarily absorbing $NO_x$.

Note that, at this time, sometimes the basic layer 53 temporarily adsorbs the $NO_x$. Therefore, if using term of storage as a term including both absorption and adsorption, at this time, the basic layer 53 performs the role of an $NO_x$ storage agent for temporarily storing the $NO_x$. That is, in this case, the ratio of the air and fuel (hydrocarbons) which are supplied into the engine intake passage, combustion chambers 2, and exhaust passage upstream of the exhaust purification catalyst 13 called the air-fuel ratio of the exhaust gas, the exhaust purification catalyst 13 functions as an $NO_x$ storage catalyst which stores the $NO_x$ when the air-fuel ratio of the exhaust gas is lean and releases the stored $NO_x$ when the oxygen concentration in the exhaust gas falls.

Figure 9:
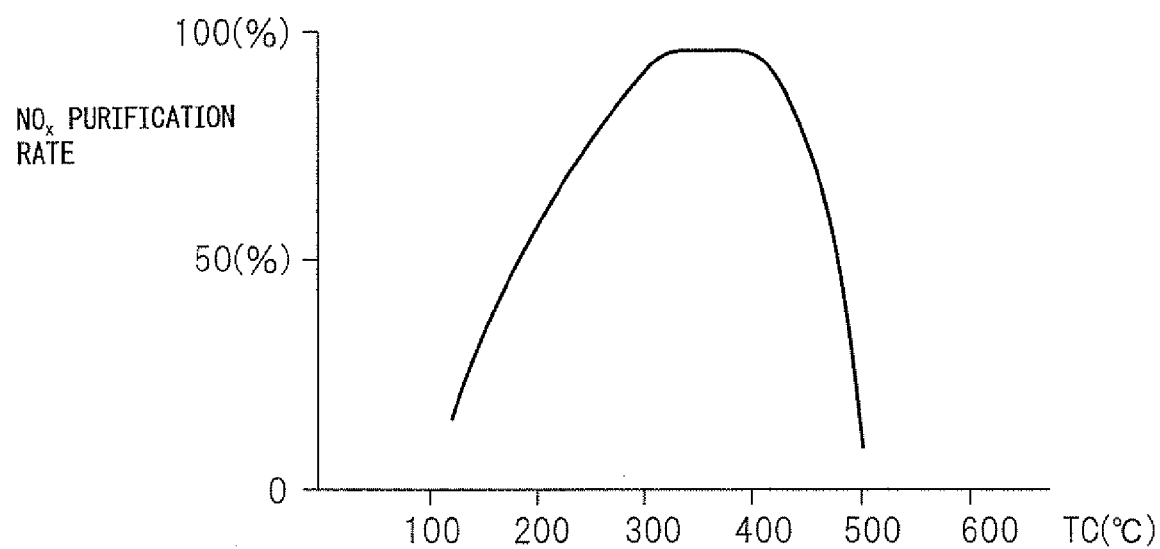
FIG. 9 is a view of an $NO_x$ purification rate.

FIG. 9 shows the $NO_x$ purification rate when making the exhaust purification catalyst 13 function as an $NO_x$ storage catalyst in this way. Note that, the abscissa of the FIG. 9 shows the catalyst temperature TC of the exhaust purification catalyst 13. When making the exhaust purification catalyst 13 function as an $NO_x$ storage catalyst, as shown in FIG. 9, when the catalyst temperature TC is 300° C. to 400° C., an extremely high $NO_x$ purification rate is obtained, but when the catalyst temperature TC becomes a 400° C. or higher high temperature, the $NO_x$ purification rate falls.

In this way, when the catalyst temperature TC becomes 400° C. or more, the $NO_x$ purification rate falls because if the catalyst temperature TC becomes 400° C. or more, the nitrates break down by heat and are released in the form of $NO_2$ from the exhaust purification catalyst 13. That is, so long as storing $NO_x$ in the form of nitrates, when the catalyst temperature TC is high, it is difficult to obtain a high $NO_x$ purification rate. However, in the new $NO_x$ purification method shown from FIG. 4 to FIGS. 6A and 6B, as will be understood from FIGS. 6A and 6B, nitrates are not formed or even if formed are extremely fine in amount, consequently, as shown in FIG. 5, even when the catalyst temperature TC is high, a high $NO_x$ purification rate is obtained.

Therefore, in the present invention, an exhaust purification catalyst 13 for reacting $NO_x$ contained in exhaust gas and reformed hydrocarbons is arranged inside of an engine exhaust passage, precious metal catalysts 51 and 52 are carried on the exhaust gas flow surface of the exhaust purification catalyst 13, around the precious metal catalysts 51 and 52, a basic exhaust gas flow surface part 54 is formed, the exhaust purification catalyst 13 has the property of reducing the $NO_x$ which is contained in exhaust gas if the concentration of hydrocarbons flowing into the exhaust purification catalyst 13 is made to vibrate within a predetermined range of amplitude and within a predetermined range of period and has the property of being increased in storage amount of $NO_x$ which is contained in exhaust gas if the vibration period of the hydrocarbon concentration is made longer than this predetermined range, and, at the time of engine operation, the concentration of hydrocarbons flowing into the exhaust purification catalyst 13 is made to vibrate by within the predetermined range of amplitude and within the predetermined range of period to thereby reduce the $NO_x$ which is contained in the exhaust gas in the exhaust purification catalyst 13.

That is, the $NO_x$ purification method which is shown from FIG. 4 to FIGS. 6A and 6B can be said to be a new $NO_x$ purification method designed to remove $NO_x$ without forming almost any nitrates in the case of using an exhaust purification catalyst which carries a precious metal catalyst and forms a basic layer which can absorb $NO_x$. In actuality, when using this new $NO_x$ purification method, the nitrates which are detected from the basic layer 53 become much smaller in amount compared with the case where making the exhaust purification catalyst 13 function as an $NO_x$ storage catalyst.

Note that, this new $NO_x$ purification method will be referred to below as the first $NO_x$ purification method.

Next, referring to FIG. 10 to FIG. 15, this first $NO_x$ purification method will be explained in a bit more detail.

Figure 10:
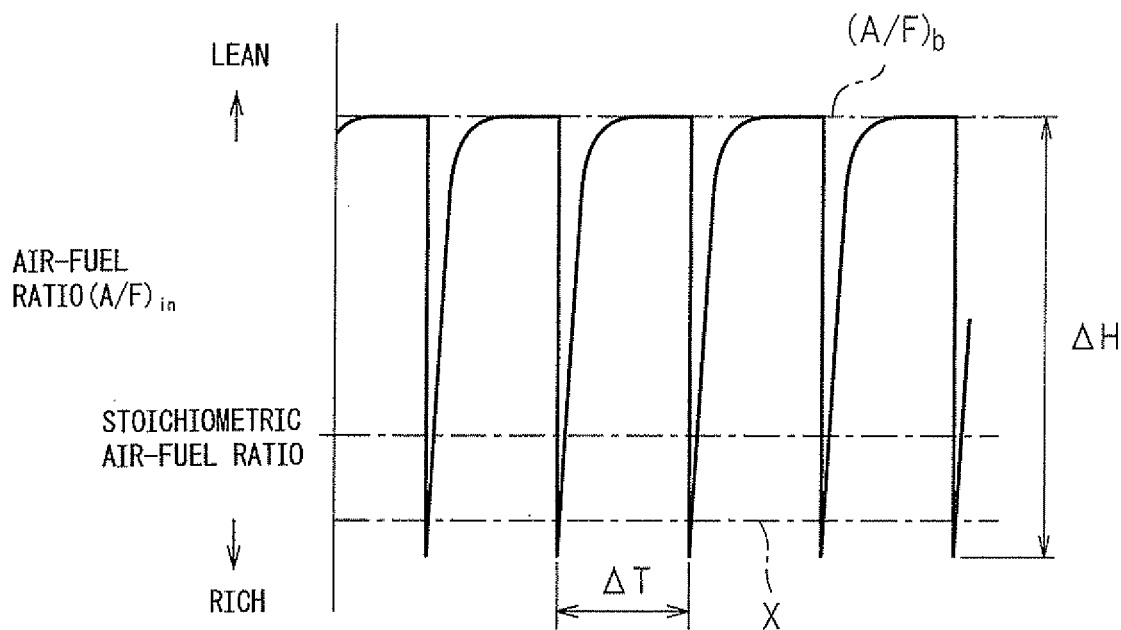
FIG. 10 is a time chart showing a change of an air-fuel ratio of exhaust gas flowing into an exhaust purification catalyst.

FIG. 10 shows enlarged the change in the air-fuel ratio (A/F)in shown in FIG. 4. Note that, as explained above, the change in the air-fuel ratio (A/F)in of the exhaust gas flowing into this exhaust purification catalyst 13 simultaneously shows the change in concentration of the hydrocarbons which flow into the exhaust purification catalyst 13. Note that, in FIG. 10, ΔH shows the amplitude of the change in concentration of hydrocarbons HC which flow into the exhaust purification catalyst 13, while ΔT shows the vibration period of the concentration of the hydrocarbons which flow into the exhaust purification catalyst 13.

Furthermore, in FIG. 10, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the exhaust purification catalyst 13 when stopping the feed of hydrocarbons. On the other hand, in FIG. 10, X shows the upper limit of the air-fuel ratio (A/F)in which is used for producing the reducing intermediate without the produced active $NO_2$* being stored in the form of nitrates inside the basic layer 53. To make the active $NO_2$* and the modified hydrocarbons react and produce the reducing intermediate, it is necessary to make the air-fuel ratio (A/F)in lower than the upper limit X of this air-fuel ratio.

In other words, in FIG. 10, X shows the lower limit of the concentration of hydrocarbons required for making the active $NO_2$* and reformed hydrocarbon react to produce a reducing intermediate. To produce the reducing intermediate, the concentration of hydrocarbons has to be made higher than this lower limit X. In this case, whether the reducing intermediate is produced is determined by the ratio of the oxygen concentration and hydrocarbon concentration around the active $NO_2$*, that is, the air-fuel ratio (A/F)in. The upper limit X of the air-fuel ratio required for producing the reducing intermediate will below be called the demanded minimum air-fuel ratio.

In the example shown in FIG. 10, the demanded minimum air-fuel ratio X is rich, therefore, in this case, to form the reducing intermediate, the air-fuel ratio (A/F)in is instantaneously made the demanded minimum air-fuel ratio X or less, that is, rich. As opposed to this, in the example shown in FIG. 11, the demanded minimum air-fuel ratio X is lean. In this case, the air-fuel ratio (A/F)in is maintained lean while periodically reducing the air-fuel ratio (A/F)in so as to form the reducing intermediate.

In this case, whether the demanded minimum air-fuel ratio X becomes rich or becomes lean depends on the oxidizing strength of the exhaust purification catalyst 13. In this case, the exhaust purification catalyst 13, for example, becomes stronger in oxidizing strength if increasing the carried amount of the precious metal 51 and becomes stronger in oxidizing strength if strengthening the acidity. Therefore, the oxidizing strength of the exhaust purification catalyst 13 changes due to the carried amount of the precious metal 51 or the strength of the acidity.

Figure 11:
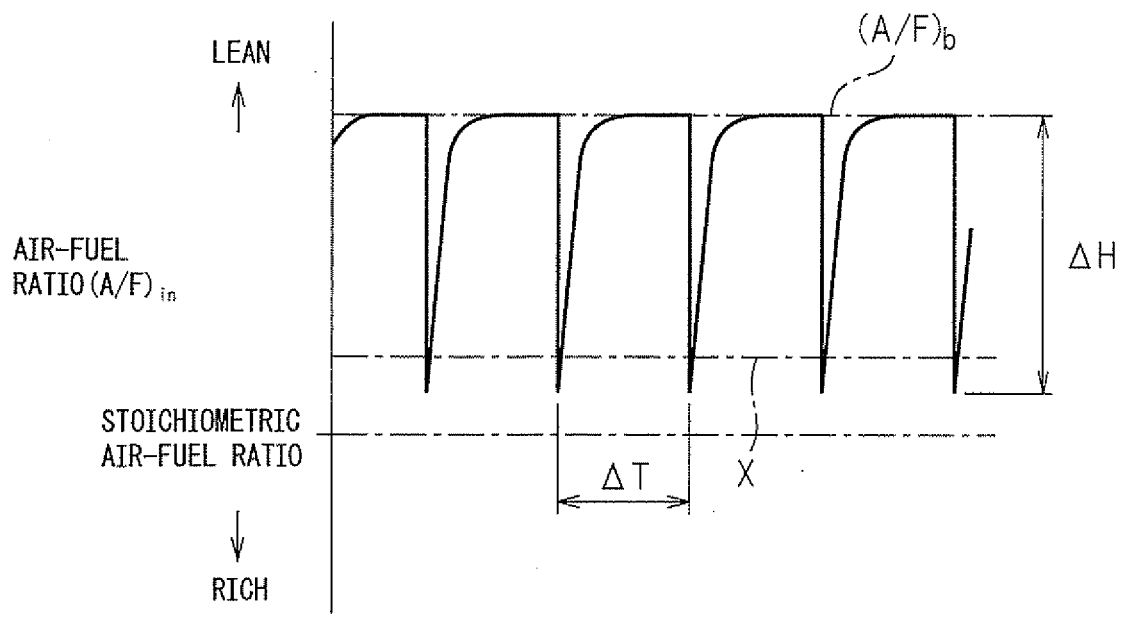
FIG. 11 is a time chart showing a change of an air-fuel ratio of exhaust gas flowing into an exhaust purification catalyst.

Now, if using an exhaust purification catalyst 13 with a strong oxidizing strength, as shown in FIG. 11, if maintaining the air-fuel ratio (A/F)in lean while periodically lowering the air-fuel ratio (A/F)in, the hydrocarbons end up becoming completely oxidized when the air-fuel ratio (A/F)in is reduced. As a result, the reducing intermediate can no longer be produced. As opposed to this, when using an exhaust purification catalyst 13 with a strong oxidizing strength, as shown in FIG. 10, if making the air-fuel ratio (A/F)in periodically rich, when the air-fuel ratio (A/F)in is made rich, the hydrocarbons will be partially oxidized, without being completely oxidized, that is, the hydrocarbons will be reformed, consequently the reducing intermediate will be produced. Therefore, when using an exhaust purification catalyst 13 with a strong oxidizing strength, the demanded minimum air-fuel ratio X has to be made rich.

On the other hand, when using an exhaust purification catalyst 13 with a weak oxidizing strength, as shown in FIG. 11, if maintaining the air-fuel ratio (A/F)in lean while periodically lowering the air-fuel ratio (A/F)in, the hydrocarbons will be partially oxidized without being completely oxidized, that is, the hydrocarbons will be reformed and consequently the reducing intermediate will be produced. As opposed to this, when using an exhaust purification catalyst 13 with a weak oxidizing strength, as shown in FIG. 10, if making the air-fuel ratio (A/F)in periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing strength, the demanded minimum air-fuel ratio X has to be made lean.

Figure 12:
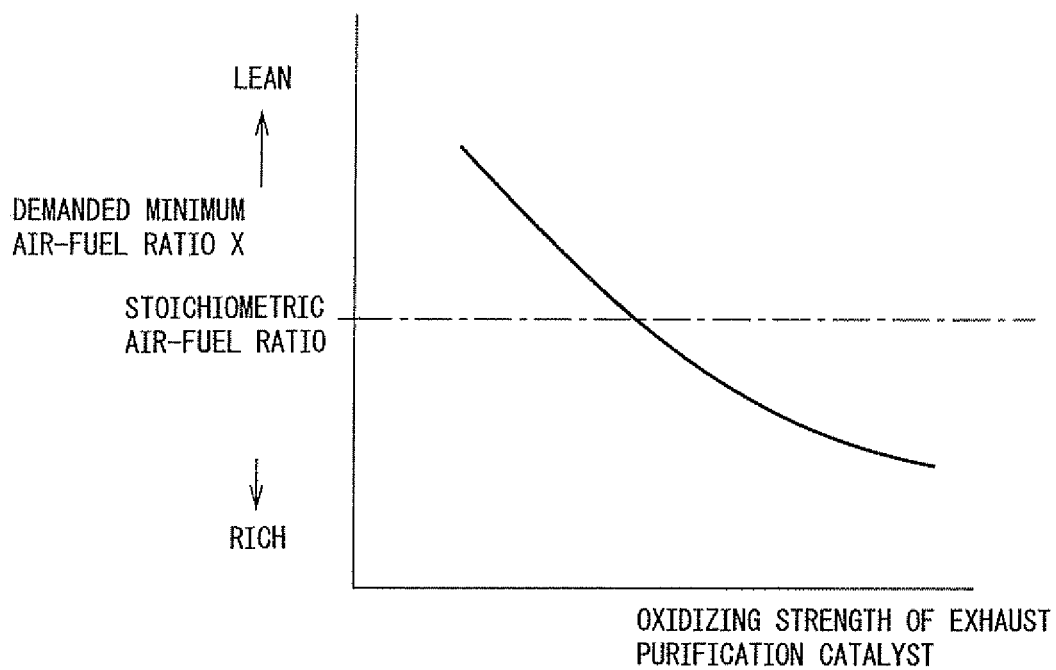
FIG. 12 is a view showing a relationship between an oxidizing strength of an exhaust purification catalyst and a demanded minimum air-fuel ratio X.

That is, it is learned that the demanded minimum air-fuel ratio X, as shown in FIG. 12, is reduced the stronger the oxidizing strength of the exhaust purification catalyst 13. In this way the demanded minimum air-fuel ratio X becomes lean or rich due to the oxidizing strength of the exhaust purification catalyst 13. Below, taking as example the case where the demanded minimum air-fuel ratio X is rich, the amplitude of the change in concentration of hydrocarbons flowing into the exhaust purification catalyst 13 and the vibration period of the concentration of hydrocarbons flowing into the exhaust purification catalyst 13 will be explained.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F)in the demanded minimum air-fuel ratio X or less increases and along with this the excess amount of hydrocarbons which did not contribute the production of the reducing intermediate also increases. In this case, to remove the $NO_x$ well, as explained above, it is necessary to make the excess hydrocarbons oxidize. Therefore, to remove the $NO_x$ well, the larger the amount of excess hydrocarbons, the larger the amount of oxygen which is required.

In this case, if raising the oxygen concentration in the exhaust gas, the amount of oxygen can be increased. Therefore, to remove the $NO_x$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 13:
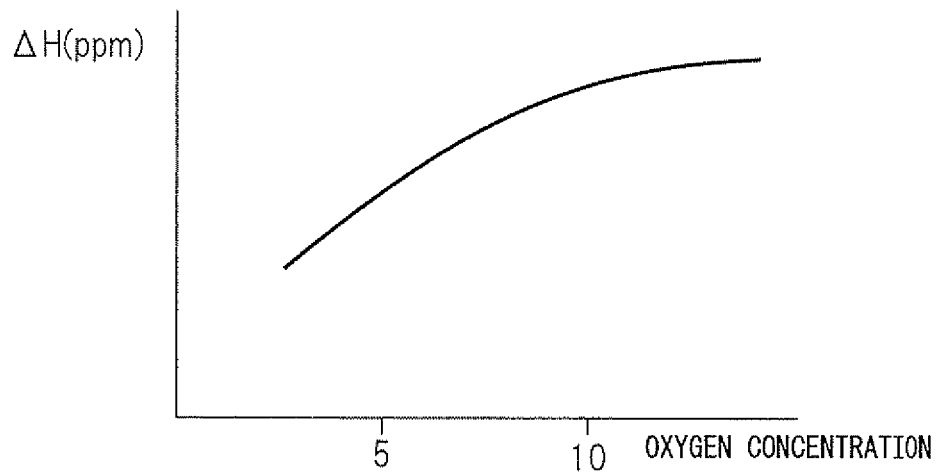
FIG. 13 is a view showing a relationship between an oxygen concentration in exhaust gas and an amplitude $\Delta H$ of a hydrocarbon concentration giving the same $NO_x$ purification rate.

FIG. 13 shows the relationship between the oxygen concentration in the exhaust gas before the hydrocarbons are fed and the amplitude ΔH of the hydrocarbon concentration when the same $NO_x$ purification rate is obtained. To obtain the same $NO_x$ purification rate, from FIG. 13, it is learned that the higher the oxygen concentration in the exhaust gas before the hydrocarbons are fed, the greater the amplitude ΔH of the hydrocarbon concentration has to be made. That is, to obtain the same $NO_x$ purification rate, the higher the base air-fuel ratio (A/F)b, the greater the amplitude ΔT of the hydrocarbon concentration has to be made. In other words, to remove the $NO_x$ well, the lower the base air-fuel ratio (A/F)b, the more the amplitude $\Delta T$ of the hydrocarbon concentration can be reduced.

Figure 14:
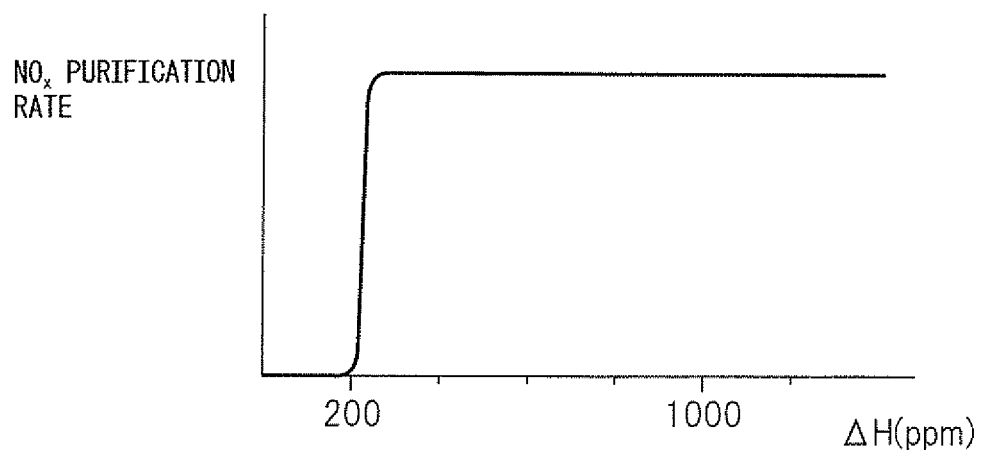
FIG. 14 is a view showing a relationship between an amplitude $\Delta H$ of a hydrocarbon concentration and an $NO_x$ purification rate.

In this regard, the base air-fuel ratio (A/F)b becomes the lowest at the time of an acceleration operation. At this time, if the amplitude $\Delta H$ of the hydrocarbon concentration is about 200 ppm, it is possible to remove the $NO_x$ well. The base air-fuel ratio (A/F)b is normally larger than the time of acceleration operation. Therefore, as shown in FIG. 14, if the amplitude $\Delta H$ of the hydrocarbon concentration is 200 ppm or more, an excellent $NO_x$ purification rate can be obtained.

On the other hand, it is learned that when the base air-fuel ratio (A/F)b is the highest, if making the amplitude $\Delta H$ of the hydrocarbon concentration 10000 ppm or so, an excellent $NO_x$ purification rate is obtained. Therefore, in the present invention, the predetermined range of the amplitude of the hydrocarbon concentration is made 200 ppm to 10000 ppm.

Figure 15:
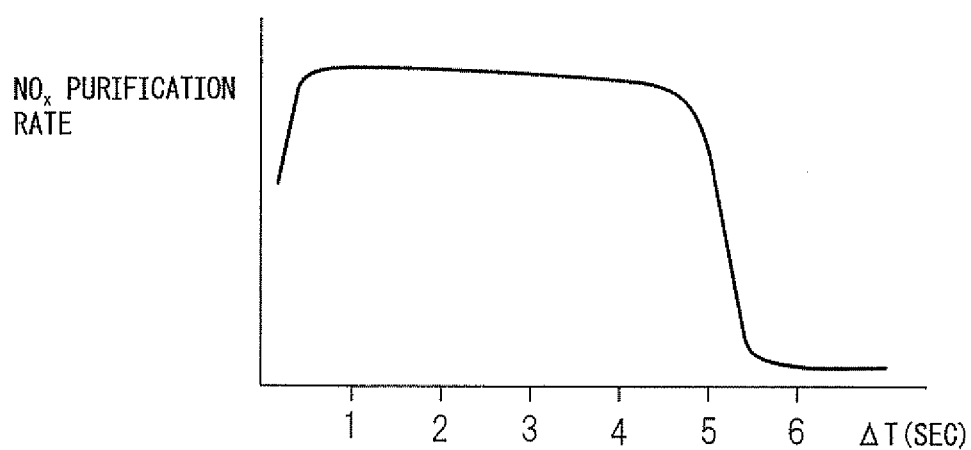
FIG. 15 is a view showing a relationship of a vibration period $\Delta T$ of a hydrocarbon concentration and an $NO_x$ purification rate.

Further, if the vibration period $\Delta T$ of the hydrocarbon concentration becomes longer, the oxygen concentration around the active $NO_2^*$ becomes higher in the time after the hydrocarbons are fed to when the hydrocarbons are next fed. In this case, if the vibration period $\Delta T$ of the hydrocarbon concentration becomes longer than about 5 seconds, the active $NO_2^*$ starts to be absorbed in the form of nitrates inside the basic layer 53. Therefore, as shown in FIG. 15, if the vibration period $\Delta T$ of the hydrocarbon concentration becomes longer than about 5 seconds, the $NO_x$ purification rate falls. Therefore, the vibration period $\Delta T$ of the hydrocarbon concentration has to be made 5 seconds or less.

On the other hand, if the vibration period $\Delta T$ of the hydrocarbon concentration becomes about 0.3 second or less, the fed hydrocarbons start to build up on the exhaust gas flow surface of the exhaust purification catalyst 13, therefore, as shown in FIG. 15, if the vibration period $\Delta T$ of the hydrocarbon concentration becomes about 0.3 second or less, the $NO_x$ purification rate falls. Therefore, in the present invention, the vibration period of the hydrocarbon concentration is made from 0.3 second to 5 seconds.

Figure 16:
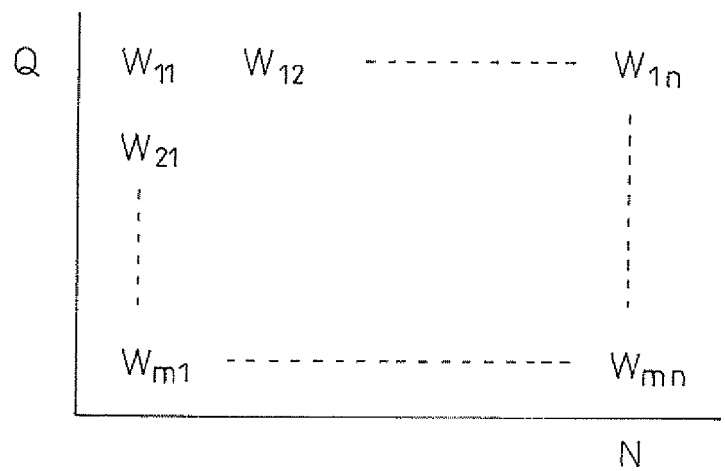
FIG. 16 is a view showing a map of the hydrocarbon feed amount W.

Now, in the present invention, the hydrocarbon feed amount and injection timing from the hydrocarbon feed valve 15 are made to change so as to control the amplitude $\Delta H$ and vibration period $\Delta T$ of the hydrocarbons concentration to become the optimum values in accordance with the engine operating state. In this case, in this embodiment of the present invention, the hydrocarbon feed amount W able to give the optimum amplitude $\Delta H$ of the hydrocarbon concentration is stored as a function of the injection amount Q from the fuel injector 3 and engine speed N in the form of a map such as shown in FIG. 16 in advance in the ROM 32. Further, the optimum vibration amplitude $\Delta T$ of the hydrocarbon concentration, that is, the injection period $\Delta T$ of the hydrocarbons, is similarly stored as a function of the injection amount Q and engine speed N in the form of a map in advance in the ROM 32.

Next, referring to FIG. 17 to FIG. 20, an $NO_x$ purification method in the case when making the exhaust purification catalyst 13 function as an $NO_x$ storage catalyst will be explained in detail. The $NO_x$ purification method in the case when making the exhaust purification catalyst 13 function as an $NO_x$ storage catalyst in this way will be referred to below as the second $NO_x$ purification method.

Figure 17:
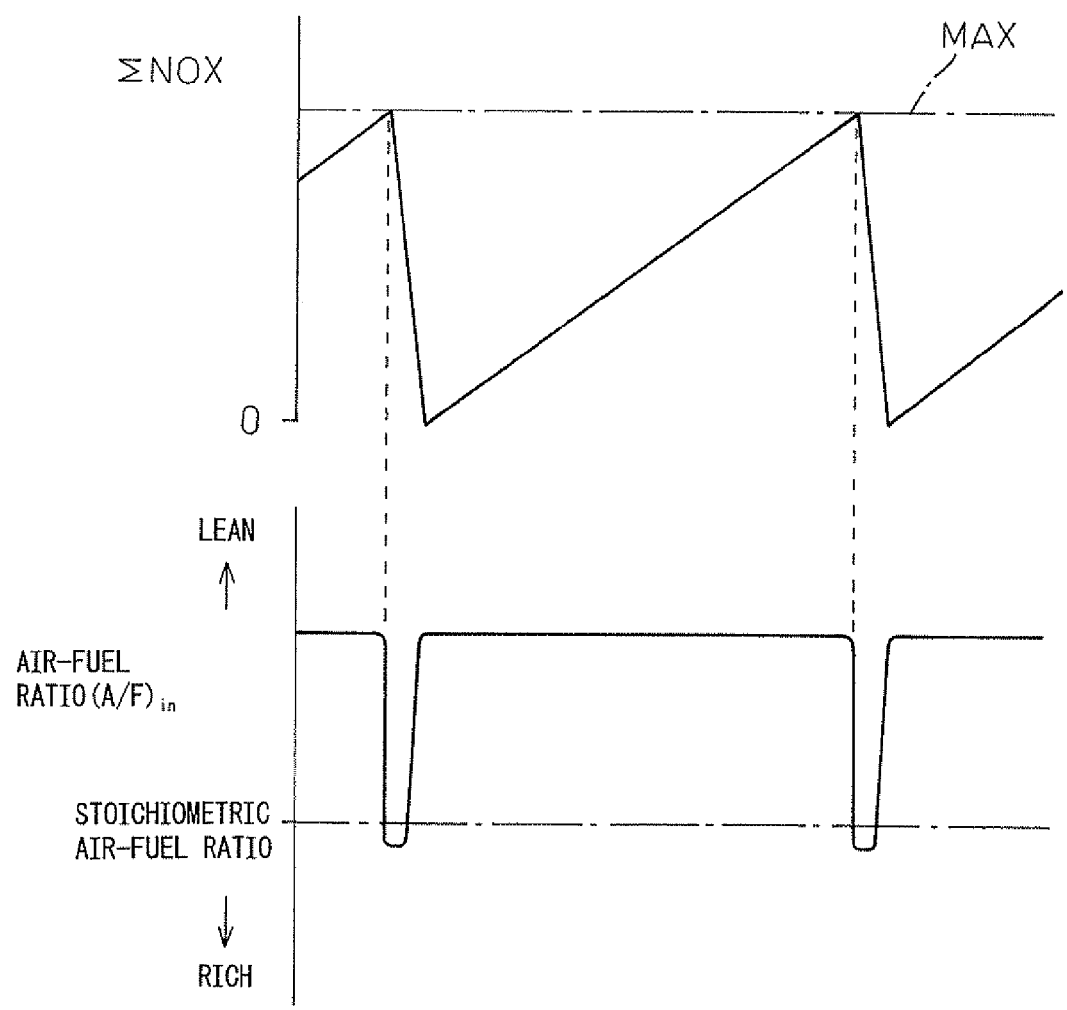
FIG. 17 is a view showing a change in the air-fuel ratio of the exhaust gas flowing to the exhaust purification catalyst etc.

In this second $NO_x$ purification method, as shown in FIG. 17, when the stored $NO_x$ amount $\Sigma NOX$ of $NO_x$ which is stored in the basic layer 53 exceeds a predetermined allowable amount MAX, the air-fuel ratio (A/F)in of the exhaust gas flowing into the exhaust purification catalyst 13 is temporarily made rich. If the air-fuel ratio (A/F)in of the exhaust gas is made rich, the NO which was stored in the basic layer 53 when the air-fuel ratio (A/F)in of the exhaust gas was lean is released from the basic layer 53 all at once and reduced. Due to this, the $NO_x$ is removed.

Figure 18:
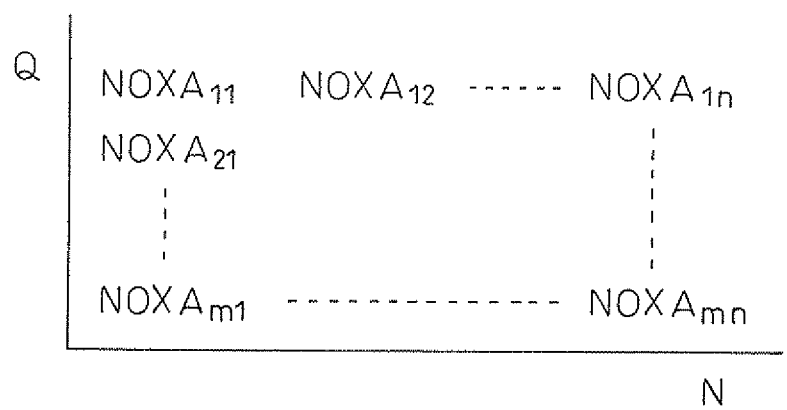
FIG. 18 is a view showing a map of an exhausted $NO_x$ amount NOXA.

The stored $NO_x$ amount $\Sigma NOX$ is, for example, calculated from the amount of $NO_x$ which is exhausted from the engine. In this embodiment according to the present invention, the exhausted $NO_x$ amount NOXA of $NO_x$ which is exhausted from the engine per unit time is stored as a function of the injection amount Q and engine speed N in the form of a map such as shown in FIG. 18 in advance in the ROM 32. The stored $NO_x$ amount $\Sigma NOX$ is calculated from exhausted $NO_x$ amount NOXA. In this case, as explained before, the period during which the air-fuel ratio (A/F)in of the exhaust gas is made rich is usually 1 minute or more.

Figure 19:
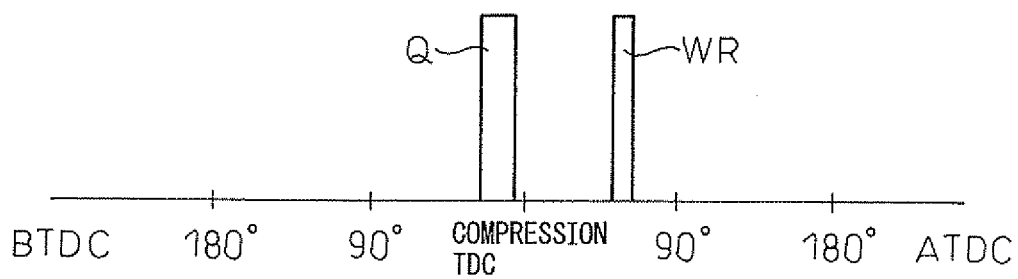
FIG. 19 is a view showing a fuel injection timing.
Figure 20:
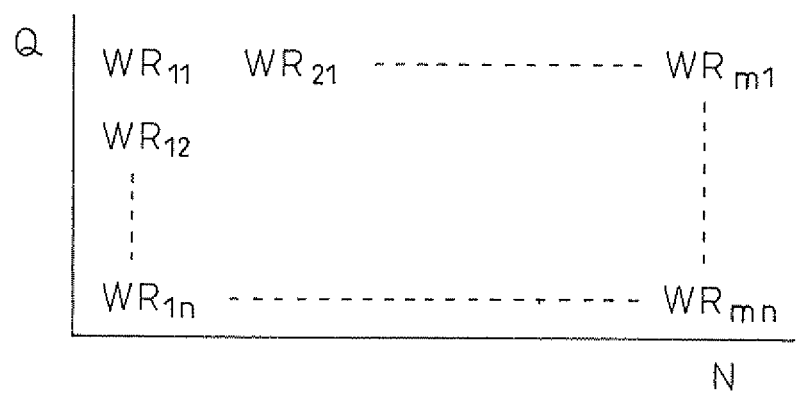
FIG. 20 is a view showing a map of a hydrocarbon feed amount WR.

In this second $NO_x$ purification method, as shown in FIG. 19, the fuel injector 3 injects additional fuel WR in the combustion chamber 2 in addition to the combustion-use fuel Q so that the air-fuel ratio (A/F)in of the exhaust gas flowing into the exhaust purification catalyst 13 is made rich. Note that, in FIG. 19, the abscissa indicates the crank angle. This additional fuel WR is injected at a timing at which it will burn, but will not appear as engine output, that is, slightly before ATDC90° after compression top dead center. This fuel amount WR is stored as a function of the injection amount Q and engine speed N in the form of a map such as shown in FIG. 20 in advance in the ROM 32. Of course, in this case, it is also possible to make the amount of feed of hydrocarbons from the hydrocarbon feed valve 15 increase so as to make the air-fuel ratio (A/F)in of the exhaust gas rich.

In this regard, to remove $NO_x$ by using the first $NO_x$ purification method, even when the $NO_x$ concentration in the exhaust gas is low, at least a certain amount of hydrocarbons has to be fed in a short period. Therefore, when the $NO_x$ concentration of the exhaust gas is low, the $NO_x$ purification efficiency becomes poor. As opposed to this, in the second $NO_x$ purification method, when the $NO_x$ concentration in the exhaust gas is low, the time until the stored $NO_x$ amount $\Sigma NOX$ reaches the allowable value MAX becomes longer, so the period for making the air-fuel ratio (A/F)in of the exhaust gas rich just becomes longer. Accordingly, the $NO_x$ purification efficiency does not particularly become worse. Therefore, when the $NO_x$ concentration in the exhaust gas is low, use of the second $NO_x$ purification method rather than the first $NO_x$ purification method can be said to be preferable. That is, which of the first $NO_x$ purification method and second $NO_x$ purification method should be used changes in the engine operating state.

Now, as explained before, when using the first $NO_x$ purification method for the $NO_x$ purification action, as shown in FIG. 6A, the reducing intermediate R—NCO or R—$NH_2$ reacts with the active $NO_2^*$ to form $N_2$, $CO_2$, and $H_2O$. However, in practice, not all of the reducing intermediate reacts with the active $NO_2^*$ to form $N_2$, $CO_2$, and $H_2O$. Part of the reducing intermediate is exhausted as it is or in the form of a nitrogen-containing intermediate derived from that reducing intermediate from the exhaust purification catalyst 13. In this embodiment according to the present invention, at this time, the main nitrogen-containing intermediate which is exhausted from the exhaust purification catalyst 13 is the hydroxylamine $NH_2OH$.

In this regard, the nitrogen-containing intermediate which is exhausted from the exhaust purification catalyst 13 changes to $NO_x$ in the gas phase, and if a catalyst which has an oxidation function is arranged downstream of the exhaust purification catalyst 13, the nitrogen-containing intermediate which is exhausted from the exhaust purification catalyst 13 changes to $NO_x$ on this catalyst. Further, even when the reducing intermediate is exhausted as it is from the exhaust purification catalyst 13, this reducing intermediate changes to $NO_x$ in the gas phase or on the catalyst. As a result, the $NO_x$ purification rate ends up falling.

That is, in the exhaust purification system according to the present invention, at the time of engine operation, to reduce the $NO_x$ which is contained in exhaust gas at the exhaust purification catalyst 13, if making the concentration of hydrocarbons flowing into the exhaust purification catalyst 13 vibrate by within a predetermined range of amplitude $\Delta H$ and within a predetermined range of period $\Delta T$, the nitrogen-containing intermediate which is produced at the $NO_x$ reduction process is exhausted from the exhaust purification catalyst 13. Therefore, in the present invention, at this time, an intermediate purification catalyst 14 for removal of the exhausted nitrogen-containing intermediate is provided downstream of the exhaust purification catalyst 13 inside of the engine exhaust passage.

Figure 21:
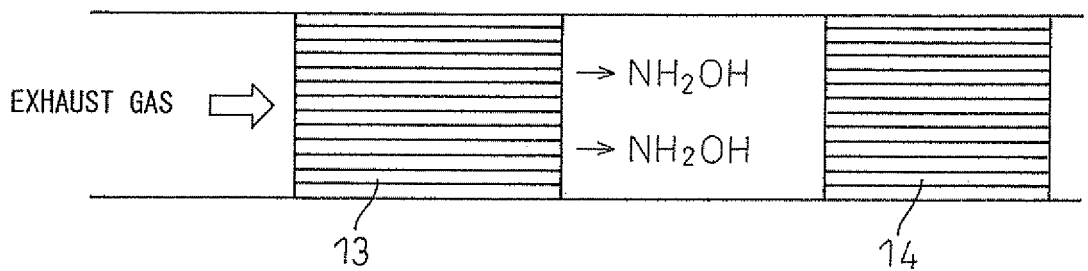
FIG. 21 is a view schematically showing an exhaust purification catalyst and intermediate purification catalyst.
Figure 22:
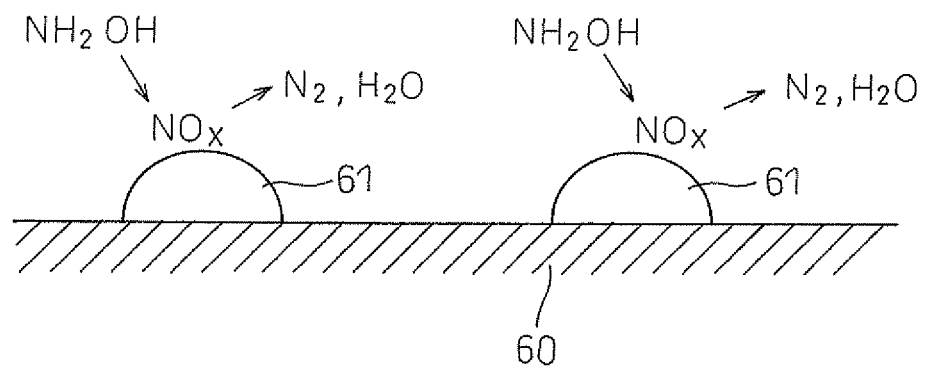
FIG. 22 is a view schematically showing a surface part of a catalyst carrier of an intermediate purification catalyst.

FIG. 21 schematically shows the exhaust purification catalyst 13 and intermediate purification catalyst 14 arranged inside of the engine exhaust passage, while FIG. 22 schematically shows the surface part of the catalyst carrier 60 of the intermediate purification catalyst 14. As shown in FIG. 22, on the catalyst carrier 60 of the intermediate purification catalyst 14, a metal 61 having a lower oxidizing strength than a precious metal is carried.

In this embodiment according to the present invention, the catalyst carrier 60 of the intermediate purification catalyst 14 is comprised of alumina or zeolite, while the metal 61 which is carried on this catalyst carrier 60 is comprised of at least one transition metal selected from silver Ag, copper Cu, iron Fe, vanadium V, molybdenum Mo, cobalt Co, nickel Ni, and manganese Mn.

As shown in FIG. 21, if the reducing intermediate or nitrogen-containing intermediate, for example, hydroxylamine $NH_2OH$, is exhausted from the exhaust purification catalyst 13, this hydroxylamine $NH_2OH$, as shown in FIG. 22, reacts on for example the metal 61 with the $NO_x$ and becomes $N_2$ and $H_2O$. In this way, the hydroxylamine $NH_2OH$ is removed. Further, the reducing intermediate and the nitrogen-containing intermediate break down on the catalyst surface of the intermediate purification catalyst 14 on their own and become $N_2$ and $H_2O$.

Note that, if strengthening the oxidizing ability of the metal 61, the reducing intermediate or nitrogen-containing intermediate ends up being converted to $NO_x$. To prevent these intermediates from being converted to $NO_x$ in this way, as the metal 61, as explained before, a metal with an oxidizing ability lower than a precious metal is used.

Figure 23:
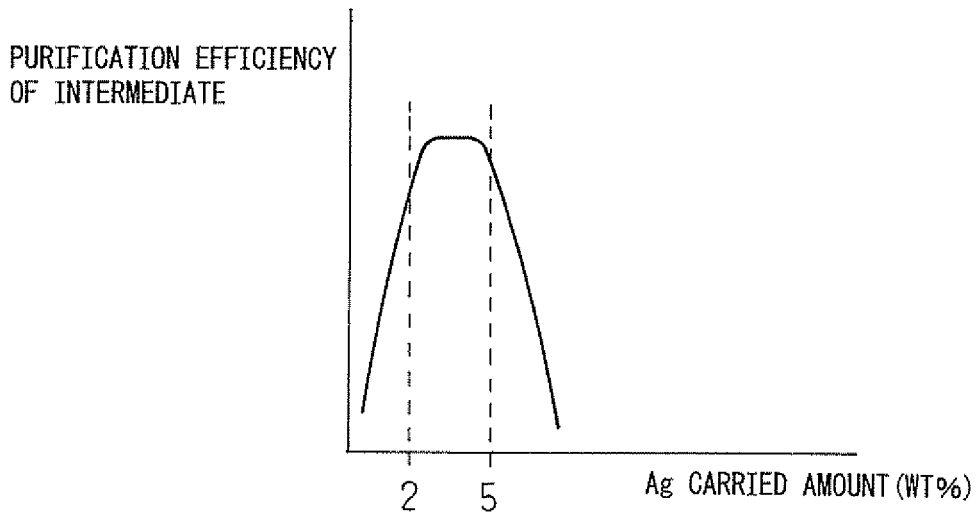
FIG. 23 is a view showing a purification efficiency for an intermediate.

FIG. 23 shows the relationship between the purification efficiency with respect to the reducing intermediate or nitrogen-containing intermediate and the carried amount of silver Ag (wt %) when using alumina as the catalyst carrier 60 and using silver Ag as the metal 61. If making the alumina carry silver Ag in this way, as shown in FIG. 23, when the carried amount of the silver Ag is 2 wt % to 5 wt %, the purification efficiency becomes the highest. Therefore, when using alumina as the catalyst carrier 60 and using silver Ag as the metal 61, the carried amount of silver Ag is made 2 wt % to 5 wt %.

On the other hand, when making the catalyst carrier 60 of the intermediate purification catalyst 14 zeolite, in addition to the nitrogen-containing intermediate, the hydrogen sulfide $H_2S$ which is exhausted from the exhaust purification catalyst 13 is removed at the intermediate purification catalyst 14. Furthermore, in this case, the ammonia $NH_3$ which is exhausted from the exhaust purification catalyst 13 is adsorbed at the intermediate purification catalyst 14. This adsorbed ammonia $NH_3$ is used to reduce the $NO_x$ which flows out from the exhaust purification catalyst 13.

Figure 24:
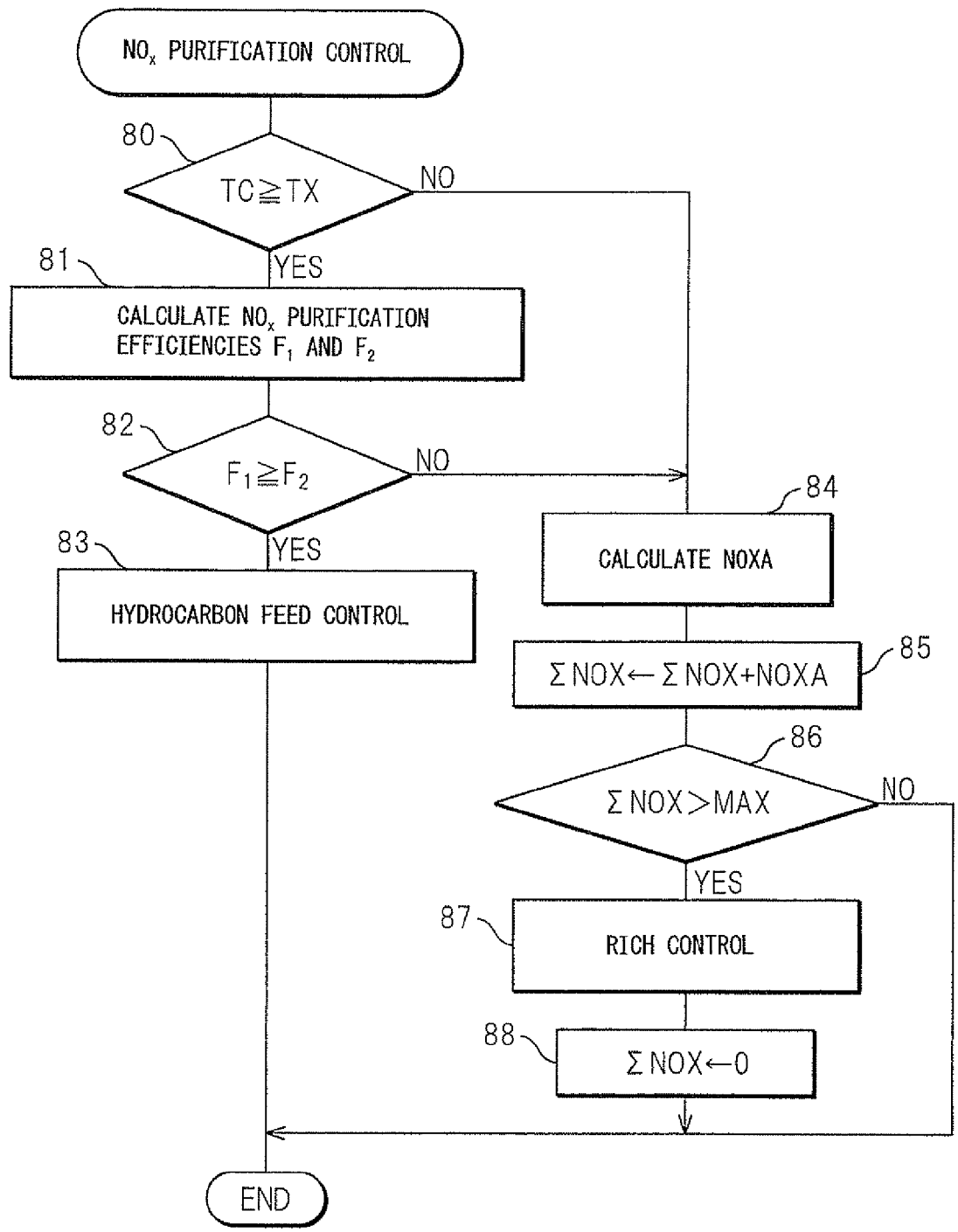
FIG. 24 is a flow chart for $NO_x$ purification control.

FIG. 24 shows the $NO_x$ purification control routine. This routine is executed by interruption every predetermined time.

Referring to FIG. 24, first, at step 80, it is judged from the output signal of the temperature sensor 23 if the temperature TC of the exhaust purification catalyst 13 exceeds the activation temperature TX. When TC≥TX, that is, when the exhaust purification catalyst 13 is activated, the routine proceeds to step 81 where the $NO_x$ purification efficiency $F_1$ when using the first $NO_x$ purification method and the $NO_x$ purification efficiency $F_2$ when using the second $NO_x$ purification method are calculated. The $NO_x$ purification efficiencies $F_1$ and $F_2$ express the amounts of consumption of fuel or hydrocarbons per unit time required for obtaining a unit $NO_x$ purification rate. In this case, the $NO_x$ purification efficiency $F_1$ is calculated from the hydrocarbon feed amount W which is calculated from the map of FIG. 16, the hydrocarbon injection intervals, and the $NO_x$ purification rate shown in FIG. 5, while the $NO_x$ purification efficiency $F_2$ is calculated from the additional fuel amount WR which is calculated from the map of FIG. 20, the interval between timings when the air-fuel ratio is made rich in FIG. 17, and the $NO_x$ purification rate shown in FIG. 9.

Next, at step 82, it is judged if the $NO_x$ purification efficiency $F_1$ is higher than the $NO_x$ purification efficiency $F_2$. When $F_1 \geq F_2$, it is judged that the first $NO_x$ purification method should be used. At this time, the routine proceeds to step 83. At step 83, the feed control of hydrocarbons from the hydrocarbon feed valve 15 is performed. At this time, the $NO_x$ purification action by the first $NO_x$ purification method is performed.

As opposed to this, when it is judged at step 80 that TC<TX or when it is judged at step 82 that $F_1 < F_2$, it is judged that the second $NO_x$ purification method should be used and the routine proceeds to step 84. At step 84, the $NO_x$ amount NOXA of $NO_x$ exhausted per unit time is calculated from the map shown in FIG. 18. Next, at step 85, $\Sigma NOX$ is incremented by the exhausted $NO_x$ amount NOXA to calculate the stored $NO_x$ amount $\Sigma NOX$. Next, at step 86, it is judged if the stored $NO_x$ amount $\Sigma NOX$ exceeds the allowable value MAX. When $\Sigma NOX > MAX$, the routine proceeds to step 87 where the additional fuel amount WR is calculated from the map shown in FIG. 20, then the action of injection of the additional fuel is performed. Next, at step 88, $\Sigma NOX$ is cleared.

Note that the radicalization action of hydrocarbons shown in FIG. 3 is not performed unless the exhaust purification catalyst 13 is activated. Therefore, the first $NO_x$ purification method cannot be used unless the exhaust purification catalyst 13 is activated. As opposed to this, the second $NO_x$ purification method is not necessarily high in purification efficiency, but can be used even when the temperature TC of the exhaust purification catalyst 13 is low. Therefore, in the routine shown in FIG. 24, when it is judged at step 80 that TC<TX, the routine proceeds to step 84 where the $NO_x$ purification action by the second $NO_x$ purification method is performed.

Next, an embodiment which gives the intermediate purification catalyst 14 an $NO_x$ adsorption function will be explained.

Figure 25:
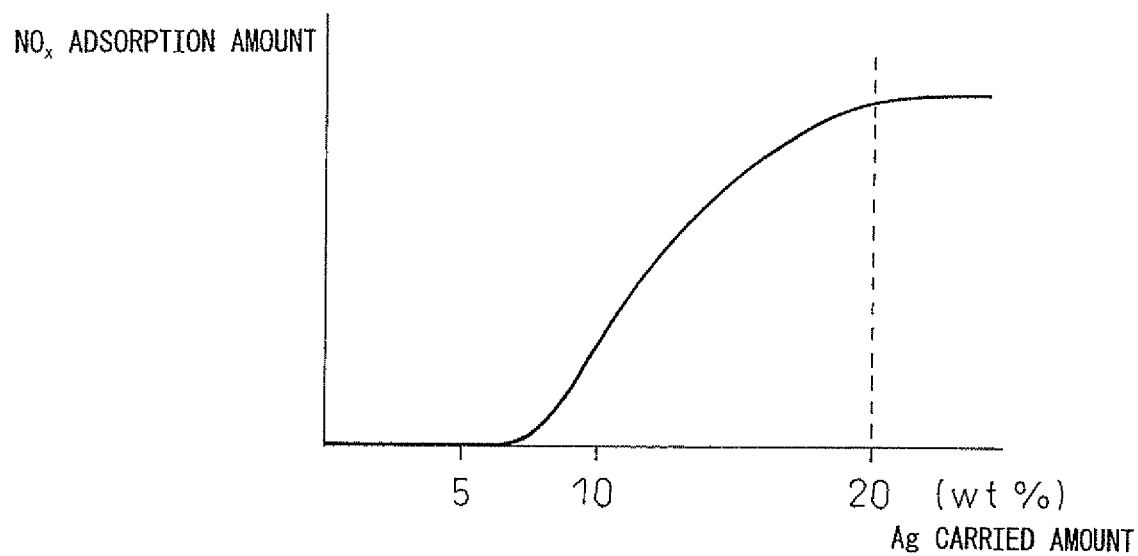
FIG. 25 is a view showing an $NO_x$ adsorption amount.

FIG. 25 shows the relationship between the $NO_x$ adsorbed amount and carried amount of silver Ag (wt %) at the intermediate purification catalyst 14 when using alumina as the catalyst carrier 60 and using silver Ag as the metal 61. When making the alumina carry silver Ag in this way, as shown in FIG. 25, if the carried amount of silver Ag becomes 10 wt % or more, the $NO_x$ adsorbed amount will become relatively high. Therefore, when using alumina as the catalyst carrier 60 and using silver Ag as the metal 61, if giving the intermediate purification catalyst 14 an $NO_x$ adsorption action, the carried amount of the silver Ag is made 10 wt % or more.

On the other hand, if making the alumina carry silver Ag, as shown in FIG. 23, when the carried amount of silver Ag is from 2 wt % to 5 wt %, the purification efficiency becomes the highest. Therefore, to secure a high purification rate for the intermediate and give an $NO_x$ adsorption function, in the embodiment shown in FIG. 26, alumina is used as the catalyst carrier 60 of the intermediate purification catalyst 14 and silver Ag is used as the metal 61, the region of the intermediate purification catalyst 14 is divided into an upstream-side part 14a and a downstream-side part 14b, the carried amount of silver Ag at the upstream-side part 14a is made 2 wt % to 5 wt % so as to secure a high $NO_x$ purification efficiency for the intermediate, the carried amount of silver Ag at the downstream-side part 14b is made 10 wt % or more so as to give an $NO_x$ adsorption function, and a reduction catalyst 62 is arranged downstream of the intermediate purification catalyst 14.

In this embodiment, the reducing intermediate or nitrogen-containing intermediate is removed at the upstream-side part 14a, while the $NO_x$ which could not be removed is adsorbed at the downstream-side part 14b. The $NO_x$ which is adsorbed at the downstream-side part 14b is removed at the reducing catalyst 62 when the air-fuel ratio of the exhaust gas flowing into the exhaust purification catalyst 13 is made rich.

Figure 26:
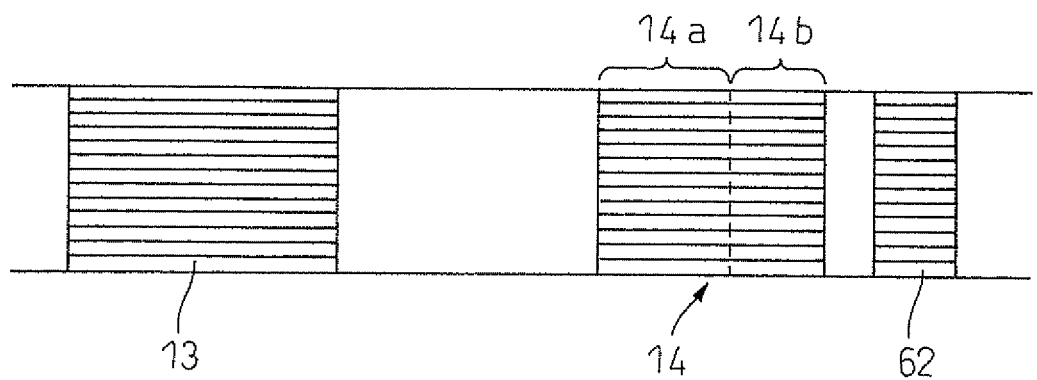
FIG. 26 is a view schematically showing another embodiment of an intermediate purification catalyst.

That is, in the embodiment shown in FIG. 26, the catalyst carrier 60 of the intermediate purification catalyst 14 is made from alumina, silver Ag is carried on the catalyst carrier 60, the nitrogen-containing intermediate is removed at the upstream-side part 14a of the intermediate purification catalyst 14, and the carried amount of silver Ag at the downstream-side part 14b is made larger than the carried amount of silver Ag at the upstream-side part 14a so that the downstream-side part 14b of the intermediate purification catalyst 14 has an $NO_x$ adsorption function.

Figure 27A:
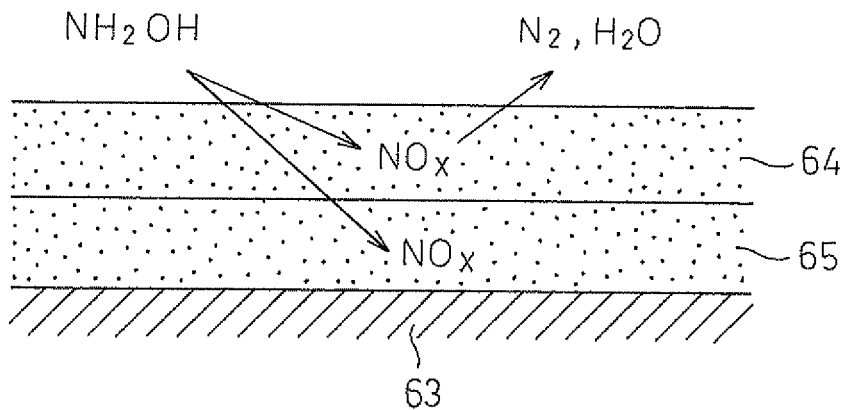
FIGS. 27A and 27B are views schematically showing the surface of a substrate of another embodiment of an intermediate purification catalyst.
Figure 27B:
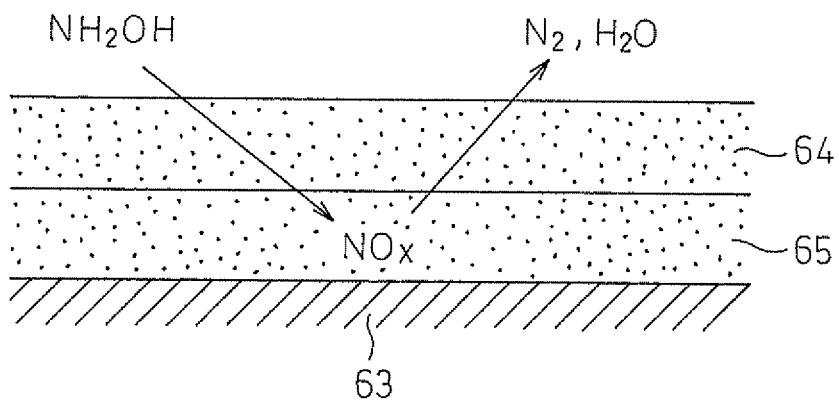

As opposed to this, in the embodiment shown in FIGS. 27A and 27B, at least two coat layers 64 and 65 including a catalyst carrier 60 comprised of alumina and silver Ag carried on the catalyst carrier 60 are formed on the substrate 63 of the intermediate purification catalyst 14. At the top coat layer 64, the nitrogen-containing intermediate is removed, and the carried amount of silver Ag at the bottom coat layer 65 is made larger than the carried amount of the silver Ag at the top coat layer 64 so that the bottom coat layer 65 is given an $NO_x$ adsorption function. Specifically speaking, in the embodiment shown in FIGS. 27A and 27B, the carried amount of silver Ag at the top coat layer 64 is made 2 wt % to 5 wt %, while the carried out of the silver Ag at the bottom coat layer 65 is made 10 wt % or more.

In this embodiment, as shown in FIG. 27A, the reducing intermediate or nitrogen-containing intermediate, for example, hydroxylamine $NH_2OH$, is removed by reaction with the $NO_x$ at the top coat layer 64, while the $NO_x$ which could not be removed is adsorbed in the bottom coat layer 65. When excessive reducing intermediate or nitrogen-containing intermediate is sent into the intermediate purification catalyst 14, the $NO_x$ which is adsorbed in the bottom coat layer 65 is removed by reacting with this intermediate as shown in FIG. 27B. Note that, in the embodiment shown in FIGS. 27A and 27B, it is not necessary to provide a reduction catalyst 62 such as shown in FIG. 26 downstream of the intermediate purification catalyst 14.

Figure 28:
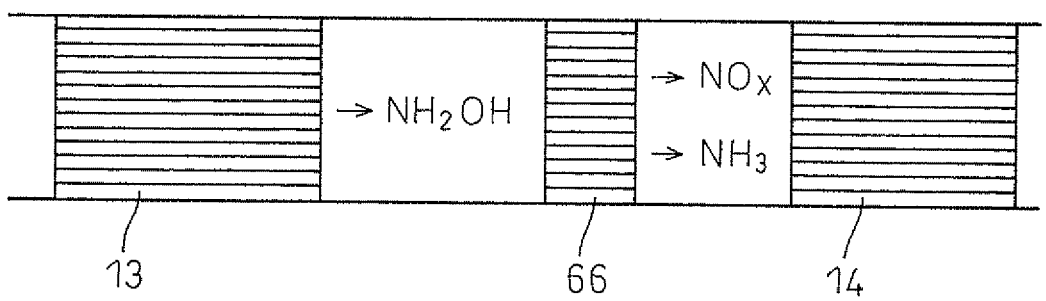
FIG. 28 is a view schematically showing an exhaust purification system comprised of an exhaust purification catalyst, hydrolysis catalyst, and intermediate purification catalyst.

In the embodiment shown in FIG. 28, a hydrolysis catalyst 66 is arranged between the exhaust purification catalyst 13 and the intermediate purification catalyst 14. The hydrolysis catalyst 66 is formed from alumina or another catalyst carrier with a large surface area relative to its volume. The reducing intermediate of nitrogen-containing intermediate which is exhausted from the exhaust purification catalyst 13 is hydrolyzed inside the hydrolysis catalyst 66. Due to this, $NO_x$ and ammonia $NH_3$ are exhausted from the hydrolysis catalyst 66 as shown in FIG. 28. This $NO_x$ is removed by the ammonia $NH_3$ at the intermediate purification catalyst 14. That is, in this embodiment, the nitrogen-containing intermediate which is exhausted from the exhaust purification catalyst 13 is removed at the intermediate purification catalyst 14 utilizing the hydrolysis action by the hydrolysis catalyst 66.

In this embodiment as well, alumina is used as the catalyst carrier 60 of the intermediate purification catalyst 14 and silver Ag is used as the metal 61. The carried amount of silver Ag is made 2 wt % to 5 wt %.

Note that, as another embodiment, in the engine exhaust passage upstream of the exhaust purification catalyst 13, an oxidation catalyst for reforming the hydrocarbons can be arranged.

REFERENCE SIGNS LIST

4 . . . intake manifold
5 . . . exhaust manifold
7 . . . exhaust turbocharger
12 . . . exhaust pipe
13 . . . exhaust purification catalyst
14 . . . intermediate purification catalyst
15 . . . hydrocarbon feed valve

The invention claimed is:

1. An exhaust purification system of an internal combustion engine comprising:
an engine exhaust passage;
an exhaust purification catalyst for reacting $NO_x$ contained in exhaust gas and reformed hydrocarbons arranged inside of the engine exhaust passage;
a precious metal catalyst carried on an exhaust gas flow surface of the exhaust purification catalyst;
a basic exhaust gas flow surface part formed around the precious metal catalyst;
an intermediate purification catalyst arranged inside of the engine exhaust passage and downstream of the exhaust purification catalyst; and
an electronic control unit, wherein the electronic control unit is configured to control a vibration of a concentration of hydrocarbons flowing into the exhaust purification catalyst within a predetermined range of amplitude and within a predetermined range of period, and is configured to control the vibration period of the hydrocarbon concentration longer than the predetermined range of period, wherein
when the electronic control unit controls the vibration of the concentration of hydrocarbons flowing into the exhaust purification catalyst within the predetermined range of amplitude and within the predetermined range of period, a reducing intermediate containing nitrogen and hydrocarbons is produced on the precious metal catalyst and held on the basic exhaust gas flow surface part, the $NO_x$ contained in the exhaust gas catalyst is chemically reduced by a reducing action of the reducing intermediate held on the basic exhaust gas flow surface part in the exhaust purification catalyst, the exhaust purification catalyst has a property of chemically reducing the $NO_x$ that is contained in the exhaust gas without storing, or storing a fine amount of nitrates in the basic exhaust gas flow surface part, and a nitrogen-containing intermediate is exhausted from the exhaust purification catalyst, wherein the intermediate purification catalyst chemically removes the exhausted nitrogen-containing intermediate, and when the electronic control unit controls the vibration period of the hydrocarbon concentration longer than the predetermined range of period, the exhaust purification catalyst has a property of being increased in a storage amount of $NO_x$ that is contained in the exhaust gas.

2. The exhaust purification system of an internal combustion engine as claimed in claim 1, wherein a catalyst carrier of the intermediate purification catalyst carries a metal with an oxidizing strength lower than a precious metal.

3. The exhaust purification system of an internal combustion engine as claimed in claim 2, wherein the metal that is carried on the catalyst carrier of the intermediate purification catalyst is at least one transition metal selected from the group consisting of silver (Ag), copper (Cu), iron (Fe), vanadium (V), molybdenum (Mo), cobalt (Co), nickel (Ni), and manganese (Mn).

4. The exhaust purification system of an internal combustion engine as claimed in claim 2, wherein the catalyst carrier of the intermediate purification catalyst is comprised of alumina.

5. The exhaust purification system of an internal combustion engine as claimed in claim 2, wherein the catalyst carrier of the intermediate purification catalyst is comprised of zeolite, in addition to the nitrogen-containing intermediate, hydrogen sulfide ($H_2S$) that is exhausted from the exhaust purification catalyst is chemically removed at the intermediate purification catalyst, and ammonia ($NH_3$) that is exhausted from the exhaust purification catalyst is adsorbed at the intermediate purification catalyst.

6. The exhaust purification system of an internal combustion engine as claimed in claim 1, wherein the nitrogen-containing intermediate is mainly comprised of hydroxylamine ($NH_2OH$).

7. The exhaust purification system of an internal combustion engine as claimed in claim 1, wherein the intermediate purification catalyst has a $NO_x$ adsorption function.

8. The exhaust purification system of an internal combustion engine as claimed in claim 7, wherein the catalyst carrier of the intermediate purification catalyst is comprised of alumina, silver (Ag) is carried on the catalyst carrier, the nitrogen-containing intermediate is chemically removed at an upstream-side part of the intermediate purification catalyst, and a carried amount of silver (Ag) at a downstream-side part of the intermediate purification catalyst is made larger than the carried amount of silver (Ag) at the upstream-side part so that the downstream-side part is has a $NO_x$ adsorption function.

9. The exhaust purification system of an internal combustion engine as claimed in claim 7, wherein the intermediate purification catalyst comprises at least one top coat layer and at least one bottom coat layer that are formed on a substrate of the intermediate purification catalyst, wherein the at least one top coat layer and the at least one bottom coat layer comprise a catalyst carrier comprised of alumina, and silver (Ag) is carried on the catalyst carrier, the nitrogen-containing intermediate is chemically removed at the top coat layer, and the carried amount of silver (Ag) on the bottom coat layer is made larger than the carried amount of silver (Ag) on the top coat layer so that the bottom coat layer has a $NO_x$ adsorption function.

10. The exhaust purification system of an internal combustion engine as claimed in claim 1, wherein a hydrolysis catalyst is arranged between the exhaust purification catalyst and the intermediate purification catalyst, and wherein the nitrogen-containing intermediate is chemically removed at the intermediate purification catalyst utilizing a hydrolysis action of the hydrolysis catalyst.

11. The exhaust purification system of an internal combustion engine as claimed in claim 1, wherein inside the exhaust purification catalyst, the nitrogen-containing intermediate is derived from the reducing intermediate, and the predetermined vibration period of the hydrocarbon concentration is a vibration period required for continued production of the reducing intermediate.

12. The exhaust purification system of an internal combustion engine as claimed in claim 11, wherein the predetermined vibration period of the hydrocarbon concentration is 0.3 second to 5 seconds.

13. The exhaust purification system of an internal combustion engine as claimed in claim 12, wherein the predetermined range of the amplitude of the hydrocarbon concentration is 200 ppm to 10000 ppm.

14. The exhaust purification system of an internal combustion engine as claimed in claim 1, wherein the precious metal catalyst is comprised of platinum (Pt) and at least one of rhodium (Rh) and/or palladium (Pd).

15. The exhaust purification system of an internal combustion engine as claimed in claim 1, wherein a basic layer containing an alkali metal, an alkali earth metal, a rare earth, and/or a metal that can donate electrons to $NO_x$ is formed on the exhaust gas flow surface of the exhaust purification catalyst and wherein the surface of the basic layer forms the basic exhaust gas flow surface part.

* * * * *